United States Patent
Alcorn et al.

(10) Patent No.: US 6,621,500 B1
(45) Date of Patent: Sep. 16, 2003

(54) SYSTEMS AND METHODS FOR RENDERING GRAPHICAL DATA

(75) Inventors: Byron A Alcorn, Ft Collins, CO (US); Joseph Norman Gee, Ft Collins, CO (US); Kevin Lefebvre, Ft Collins, CO (US); Don B. Hoffman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 09/715,882

(22) Filed: Nov. 17, 2000

(51) Int. Cl.$^7$ ................................................. G09G 5/00
(52) U.S. Cl. ...................... 345/629; 345/630; 345/632; 345/589; 345/594; 345/598; 345/606
(58) Field of Search ................................ 345/629, 630, 345/632, 589, 594, 598, 606

(56) References Cited

U.S. PATENT DOCUMENTS

| | | | |
|---|---|---|---|
| 5,408,602 A | 4/1995 | Giokas et al. | 395/157 |
| 5,757,321 A | 5/1998 | Billyard | 345/434 |
| 5,844,553 A | 12/1998 | Hao et al. | 345/329 |
| 5,923,791 A * | 7/1999 | Hanna et al. | 382/295 |
| 6,034,653 A * | 3/2000 | Robertson et al. | 345/8 |
| 6,075,917 A | 6/2000 | Kim | 386/47 |
| 6,088,036 A | 7/2000 | Morris | 345/428 |
| 6,188,385 B1 | 2/2001 | Hill et al. | 345/136 |
| 6,400,374 B2 * | 6/2002 | Lanier | 345/630 |
| 6,466,205 B2 * | 10/2002 | Simpson et al. | 345/419 |
| 6,466,226 B1 * | 10/2002 | Watson et al. | 345/610 |

OTHER PUBLICATIONS

"Understanding X Features: Distributed Single Logical Screen" http://www.hp.com/xw indow/sharedInfo/Whitepapers/Slsd/slsd.html, 1998, pp. 1–10.

Lefebvre, Kevin "Hewlett–Packard's Large Screen Multi–Display Technology: An Exploration of the Architecture Behind HP's New Immersive Visualization Solutions" http://www.hp.com;xw indow/sharedInfo/Whitepapers/Sls3d/sls_3d.html; 1998, pp. 1–9.

"Understanding X Features: Multiple Display Technologies" http://www.hp.com/xw indow/sharedInfo/Whitepapers/Sls/sls.html, 1997, pp. 1–13.

Alcorn et al., "Systems for Compositing Graphical Data," U.S. patent application No. 09/715,892, filed Nov. 17, 2000.

Robertus et al., "Systems and Methods for Compositing Graphical Data," U.S. patent application No. 09/715,232, filed Nov. 17, 2000.

Alcorn et al., "Systems and Methods for Rendering Graphical Data," U.S. patent application No. 09/715,882, filed Nov. 17, 2000.

Alcorn et al., "Systems and Methods for Rendering Active Stereo Graphical Data as Passive Stereo," U.S. patent application No. 09/715,600, filed Nov. 17, 2000.

Lefebvre et al., "System and Method for Efficiently Rendering Graphical Data," U.S. patent application No. 09/715, 335, filed Nov. 17, 2000.

Lefebvre et al., "System and Method for Efficiently Rendering a Jitter Enhanced Graphical Image," U.S. patent application No. 09/715,253, filed Nov. 17, 2000.

* cited by examiner

*Primary Examiner*—Matthew C. Bella
*Assistant Examiner*—Mike Rahmjoo

(57) ABSTRACT

A preferred method includes the step of receiving multiple digital video data streams. Preferably, a first of the multiple digital video data streams contains processed pixel data corresponding to at least a portion of the image to be rendered, and a second of the multiple digital video data streams contains processed pixel data corresponding to at least a portion of the image to be rendered as well as information, such as a chroma-key value, associated with at least some of the processed pixel data. The embodiment also preferably includes the step of combining the multiple digital video data streams into the composite digital video data stream by referencing the chroma-key values. Devices also are provided.

9 Claims, 21 Drawing Sheets

| FRAME BUFFER SEQUENCE | 0L 0R | 1L 1R |
|---|---|---|
| IMAGE SEQUENCE | 1 | 2 |

SYSTEMS AND METHODS FOR RENDERING GRAPHICAL DATA

BACKGROUND OF THE INVENTION

1. Field of the Invention

The present invention generally relates to techniques for rendering graphical data and, in particular, to systems and methods for utilizing a plurality of graphics pipelines to render graphical data to a display device.

2. Related Art

Computer graphical display systems are commonly used for displaying graphical representations of two-dimensional and/or three-dimensional objects on a two-dimensional display device, such as a cathode ray tube, for example. Current computer graphical display systems provide detailed visual representations of objects and are used in a variety of applications.

FIG. 1 depicts an exemplary embodiment of a conventional computer graphical display system 15. A graphics application 17 stored on a computer 21 defines, in data, an object to be rendered by the system 15. To render the object, the application 17 transmits graphical data defining the object to graphics pipeline 23, which may be implemented in hardware, software, or a combination thereof. The graphics pipeline 23, through well known techniques, processes the graphical data received from the application 17 and stores the graphical data in a frame buffer 26. The frame buffer 26 stores the graphical data necessary to define the image to be displayed by a display device 29. In this regard, the frame buffer 26 includes a set of data for each pixel displayed by the display device 29. Each set of data is correlated with the coordinate values that identify one of the pixels displayed by the display device 29, and each set of data includes the color value of the identified pixel as well as any additional information needed to appropriately color or shade the identified pixel. Normally, the frame buffer 26 transmits the graphical data stored therein to the display device 29 via a scanning process such that each line of pixels defining the image displayed by the display device 29 is consecutively updated.

When large images are to be displayed, multiple display devices may be used to display a single image, in which each display device displays a portion of the single image. In such an embodiment, the multiple display devices are treated as a single logical screen (SLS), and different portions of an object may be rendered by different display devices. FIG. 2 depicts an exemplary embodiment of a computer graphics system 41 capable of utilizing a plurality of display devices 31–34 to render a single logical screen. In this embodiment, a client computer 42 stores the application 17 that defines, in data, an image to be displayed. Each of the display devices 31–34 may be used to display a portion of an object such that the display devices 31–34, as a group, display a single large image of the object.

To render the object, graphical data defining the object is transmitted to an SLS server 45. The SLS server 45 routes the graphical data to each of the graphics pipelines 36–39 for processing and rendering. For example, assume that the object is to be positioned such that each of the display devices 31–34 displays a portion of the object. Each of the pipelines 36–39 renders the graphical data into a form that can be written into one of the frame buffers 46–49. Once the data has been rendered by the pipelines 36–39 to the point that the graphical data is in a form suitable for storage into frame buffers 46–49, each of the pipelines 36–39 performs a clipping process before transmitting the data to frame buffers 46–49.

In the clipping process, each pipeline 36–39 discards the graphical data defining the portions of the object that are not to be displayed by the pipeline's associated display device 31–34 (i.e., the display device 31–34 coupled to the pipeline 36–39 through one of the frame buffers 46–49). In other words, each graphics pipeline 36–39 discards the graphical data defining the portions of the object displayed by the display devices 31–34 that are not coupled to the pipeline 36–39 through one of the frame buffers 46–49. For example, pipeline 36 discards the graphical data defining the portions of the object that are displayed by display devices 32-34, and pipeline 37 discards the graphical data defining the portions of the object that are displayed by display devices 31, 33, and 34.

Thus, each frame buffer 46–49 should only store the graphical data defining the portion of the object displayed by the display device 31–34 that is coupled to the frame buffer 46–49. At least one solution for providing SLS functionality in an X Window System environment is taught by Jeffrey J. Walls, Ian A. Elliott, and John Marks in U.S. Pat. No. 6,088,005, filed Jan. 10, 1996, and entitled "Design and Method for a Large, Virtual Workspace," which is incorporated herein by reference.

A plurality of networked computer systems are often employed in implementing SLS technology. For example, in the embodiment shown by FIG. 2, the client 42, the SLS server 45, and the individual graphics pipelines 36–39 may each be implemented via a single computer system interconnected with the other computer systems within the system 41 via a computer network, such a local area network (LAN), for example. The X Window System is a standard for implementing window-based user interfaces in a networked computer environment, and it may be desirable to utilize X Protocol in rendering graphical data in the system 41. For a more detailed discussion of the X Window System and the X Protocol that defines it, see Adrian Nye, *X Protocol Reference Manual Volume Zero* (O'Riley & Associates 1990).

U.S. patent application Ser. No. 09/138,456, filed on Aug. 21, 1998, and entitled "3D Graphics in a Single Logical Screen Display Using Multiple Remote Computer Systems," which is incorporated herein by reference, describes an SLS system of networked computer stations that may be used to render two-dimensional (2D) and three-dimensional (3D) graphical data. In the embodiments described by the foregoing patent application, X Protocol is generally utilized to render 2D graphical data, and OpenGL Protocol (OGL) is generally used to render 3D graphical data.

Although it is possible to render 2D and/or 3D data in conventional computer graphical display systems, including SLS environments, there exists limitations that restrict the performance and/or image quality exhibited by the conventional computer graphical display systems. More specifically, high quality images, particularly 3D images, are typically defined by a large amount of graphical data, and the speed at which conventional graphics pipelines 36–39 can process the graphical data defining an object is limited. Thus, a trade-off often exists between increasing the quality of the image rendered by a computer graphical display system and the speed at which the image can be rendered, and there exists a need in the industry for better techniques and systems for rendering graphical data.

SUMMARY OF THE INVENTION

Briefly described, the present invention relates to utilizing a plurality of graphics pipelines to render graphical data to a display monitor. In this regard, embodiments of the present invention may be construed as providing methods for producing a composite digital video data stream, which contains data corresponding to an image to be rendered. A preferred embodiment includes the step of receiving multiple digital video data streams. Preferably, a first of the multiple digital video data streams contains processed pixel data corresponding to at least a portion of the image to be rendered, and a second of the multiple digital video data streams contains processed pixel data corresponding to at least a portion of the image to be rendered as well as information, such as a chroma-key value, associated with at least some of the processed pixel data. The embodiment also includes the step of combining the multiple digital video data streams into the composite digital video data stream by referencing the chroma-key values.

Other embodiments of the present invention may be construed as providing devices for enabling production of a composite digital video data stream. In this regard, a preferred embodiment includes a first compositing element, and a second compositing element. The first compositing element is configured to receive pixel data from a first of the multiple digital video data streams so that, in response to receiving the pixel data from the first of the multiple digital video data streams, a frame of data is provided that corresponds to a resolution of the image to be rendered. Additionally, the first compositing element inserts pixel data from the first of the multiple digital video data streams into the frame of data. The second compositing element communicates with the first compositing element, and is configured to receive pixel data and chroma-key values from a second of the multiple digital video data streams. The second compositing element also is configured to overwrite at least a portion of the frame of data with pixel data of the second of the multiple digital video data streams so that pixel data from the first of the multiple digital video data streams remains in the frame of data at locations corresponding to occurrences of the chroma-key value.

An alternative embodiment of the present invention includes means for receiving the multiple digital video data streams, and means for combining the multiple digital video data streams into the composite digital video data stream by referencing chroma-key values.

Another alternative embodiment of the present invention includes logic configured to receive the multiple digital video data streams, and logic configured to combine the multiple digital video data streams into the composite digital video data stream by referencing chroma-key values. In some of these embodiments, the various logic may be embodied in computer readable media.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

In general, the present invention pertains to a computer graphical display system employing a plurality of graphics pipelines that process graphical data in parallel. The graphics pipelines provide the graphical data to a compositor that combines or composites the graphical data into a single data stream that can be rendered via a single display device. The parallel processing of graphical data according to the present invention enables improved performance and/or improved image quality over conventional computer graphical display systems.

Figure 3:
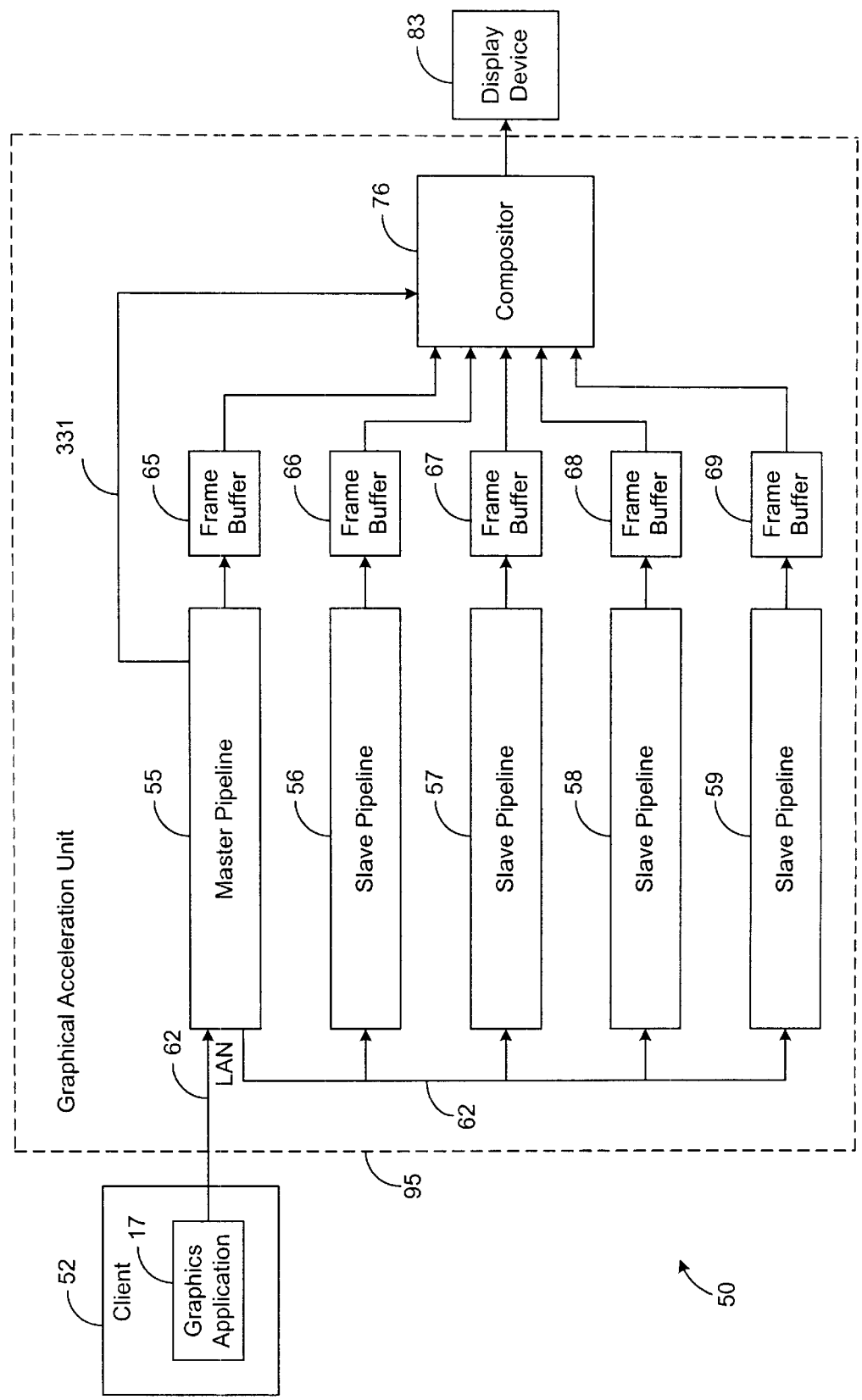
FIG. 3 is a block diagram illustrating a graphical display system in accordance with the present invention.

FIG. 3 depicts a computer graphical display system 50 in accordance with the present invention. As shown by FIG. 3, the system 50 includes a client 52, a master graphics pipeline 55, and one or more slave graphics pipelines 56–59. The client 52 and pipelines 55–59 may be implemented via hardware, software or any combination thereof. It should be noted that the embodiment shown by FIG. 3 depicts four slave pipelines 56–59 for illustrative purposes only, and any number of slave pipelines 56–59 may be employed to implement the present invention in other embodiments. As shown by FIG. 3, the pipelines 55–59, frame buffers 65–69, and compositor 76 that render graphical data to a single display device 83 are collectively referred to herein as a graphical accelerations unit 95.

The master pipeline 55 receives graphical data from the application 17 stored in the client 52. The master pipeline 55 preferably renders two-dimensional (2D) graphical data to frame buffer 65 and routes three-dimensional (3D) graphical data to slave pipelines 56–59, which render the 3D graphical data to frame buffers 66–69, respectively. Except as otherwise described herein, the client 52 and the pipelines 55–59 may be configured similar to pipelines described in U.S. patent application Ser. No. 09/138,456. The client 52 and the pipelines 55–59 will be described in more detail hereinafter.

Each frame buffer 65–69 outputs a stream of graphical data to the compositor 76. The compositor 76 is configured to combine or composite each of the data streams from frame buffers 65–69 into a single data stream that is provided to display device 83, which may be a display device (e.g., cathode ray tube) for displaying an image. The graphical data provided to the display device 83 by the compositor 76 defines the image to be displayed by the display device 83 and is based on the graphical data received from frame buffers 65–69. The compositor 76 will be further described in more detail hereinafter. Note that each data stream depicted in FIG. 3 may be either a serial data stream or a parallel data stream.

In the preferred embodiment, the client 52 and each of the pipelines 55–59 are respectively implemented via stand alone computer systems, commonly referred to as a "computer workstations." Thus, the system 50 shown by FIG. 3 may be implemented via six computer workstations (i.e., one computer workstation for the client 52 and one computer workstation for each of the pipelines 55–59). However, it is possible to implement the client 52 and pipelines 55–59 via other configurations, including other numbers of computer workstations or no computer workstations. As an example, the client 52 and the master pipeline 55 may be implemented via a single computer workstation. Any computer workstation used to implement the client 52 and/or pipelines 55–59 may be utilized to perform other desired functionality when the workstation is not being used to render graphical data.

Furthermore, as shown by FIG. 3, the client 52 and the pipelines 55–59 may be interconnected via a local area network (LAN) 62. However, it is possible to utilize other types of interconnection circuitry without departing from the principles of the present invention.

Figure 4:
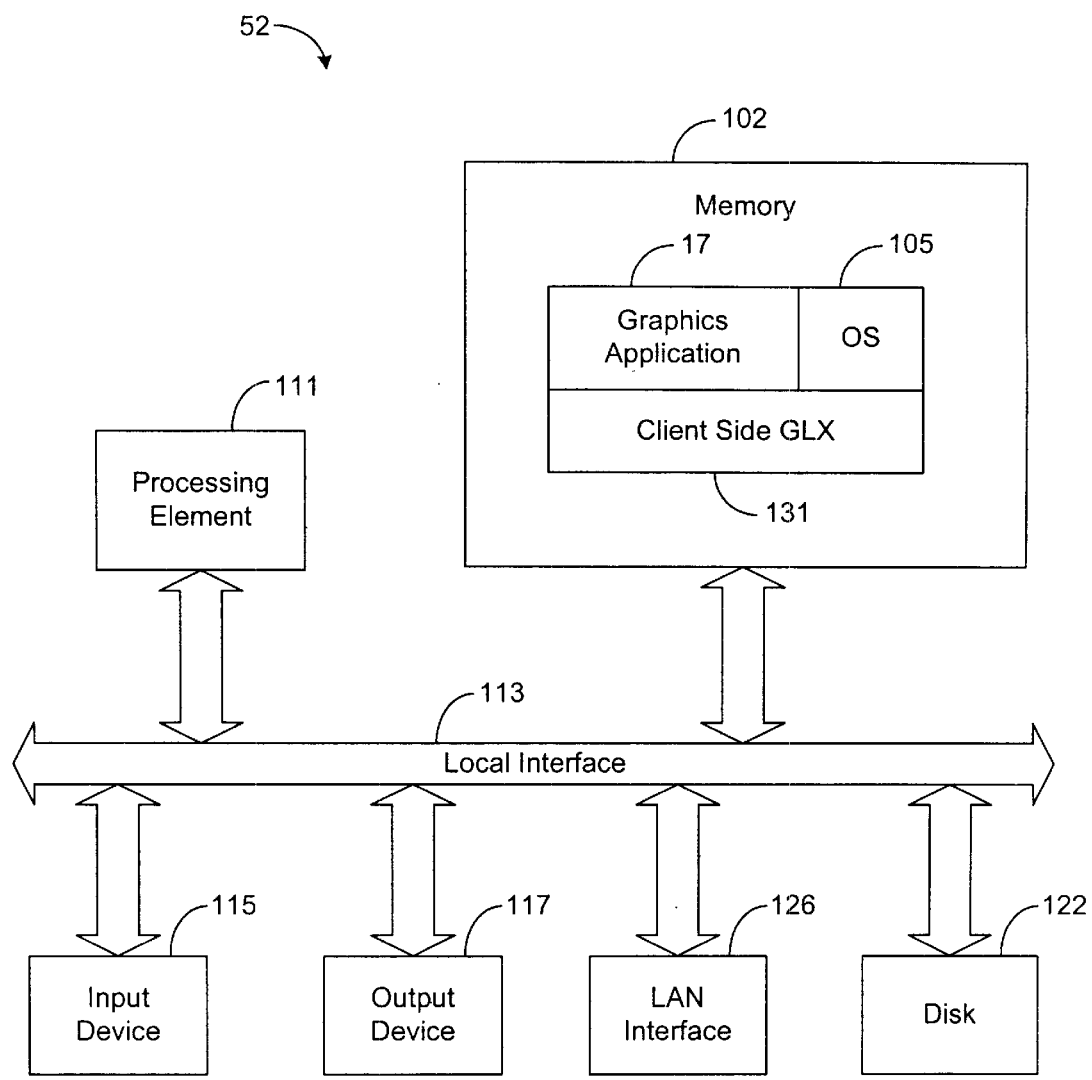
FIG. 4 is a block diagram illustrating a more detailed view of a client depicted in FIG. 3

FIG. 4 depicts a more detailed view of the client 52. As can be seen by referring to FIG. 4, the client 52 preferably stores the graphics application 17 in memory 102. Through conventional techniques, the application 17 is executed by an operating system 105 and one or more conventional processing elements 111, such as a central processing unit (CPU), for example. The operating system 105 performs functionality similar to conventional operating systems. More specifically, the operating system 105 controls the resources of the client 52 through conventional techniques and interfaces the instructions of the application 17 with the processing element 111 as necessary to enable the application 17 to run properly.

The processing element 111 communicates to and drives the other elements within the client 52 via a local interface 113, which can include one or more buses. Furthermore, an input device 115, for example, a keyboard or a mouse, can be used to input data from a user of the client 52, and an output device 117, for example, a display device or a printer, can be used to output data to the user. A disk storage mechanism 122 can be connected to the local interface 113 to transfer data to and from a nonvolatile disk (e.g., magnetic, optical, etc.). The client 52 is preferably connected to a LAN interface 126 that allows the client 52 to exchange data with the LAN 62.

In the preferred embodiment, X Protocol is generally utilized to render 2D graphical data, and OpenGL Protocol (OGL) is generally utilized to render 3D graphical data, although other types of protocols may be utilized in other embodiments. By way of background, OpenGL Protocol is a standard application programmer's interface (API) to hardware that accelerates 3D graphics operations. Although OpenGL Protocol is designed to be window system independent, it is often used with window systems, such as the X Window System, for example. In order that OpenGL Protocol may be used in an X Window System environment, an extension of the X Window System has been developed called GLX. For more complete information on the GLX extension to the X Window System and on how OpenGL Protocol can be integrated with the X Window System, see for example Mark J. Kilgard, *OpenGL Programming for the X Window System* (Addison-Wesley Developers Press 1996), which is incorporated herein by reference.

Figure 5:
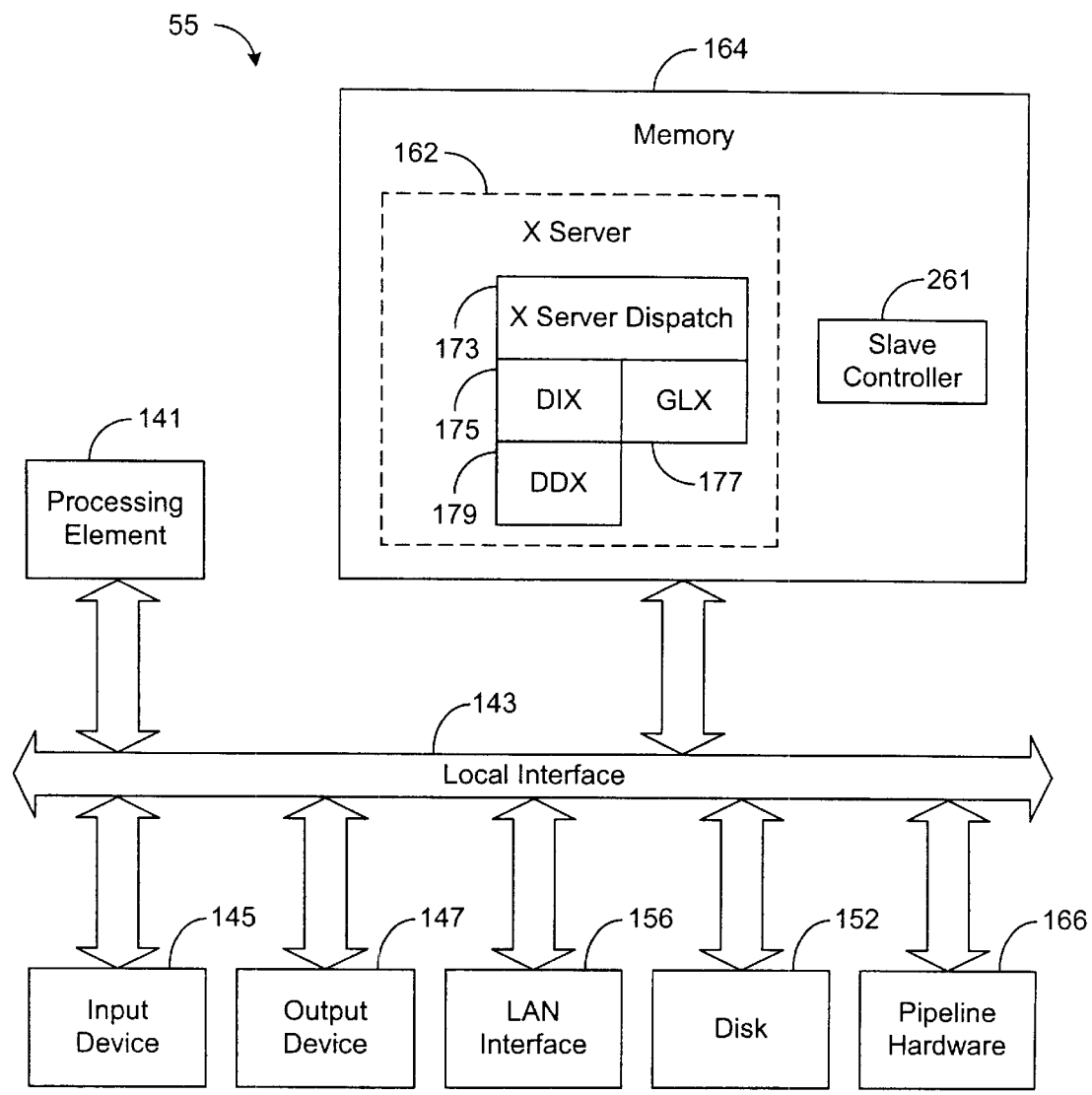
FIG. 5 is a block diagram illustrating a more detailed view of a master pipeline depicted in FIG. 3.

When the application 17 issues a graphical command, a client side GLX layer 131 of the client 52 transmits the command over LAN 62 to master pipeline 55. FIG. 5 depicts a more detailed view of the master pipeline 55. Similar to client 52, the master pipeline 55 includes one or more processing elements 141 that communicate to and drive the other elements within the master pipeline 55 via a local interface 143, which can include one or more buses. Furthermore, an input device 145, for example, a keyboard or a mouse, can be used to input data from a user of the pipeline 55, and an output device 147, for example, a display device or a printer, can be used to output data to the user. A disk storage mechanism 152 can be connected to the local interface 143 to transfer data to and from a nonvolatile disk (e.g., magnetic, optical, etc.). The pipeline 55 may be connected to a LAN interface 156 that allows the pipeline 55 to exchange data with the LAN 62.

The pipeline 55 also includes an X server 162. The X server 162 may be implemented in software, hardware, or a combination thereof, and in the embodiment shown by FIG. 5, the X server 162 is implemented in software and stored in memory 164. In the preferred embodiment, the X server 162 renders 2D X window commands, such as commands to create or move an X window. In this regard, an X server dispatch layer 173 is designed to route received commands to a device independent layer (DIX) 175 or to a GLX layer 177. An X window command that does not include 3D data is interfaced with DIX, whereas an X window command that does include 3D data (e.g., an X command having embedded OGL protocol, such as a command to create or change the state of a 3D image within an X window) is routed to GLX layer 177. A command interfaced with the DIX 175 is executed by the DIX 175 and potentially by a device dependent layer (DDX) 179, which drives graphical data associated with the executed command through pipeline hardware 166 to frame buffer 65. A command interfaced with GLX layer 177 is transmitted by the GLX layer 177 across LAN 62 to slave pipelines 56–59. One or more of the pipelines 56–59 executes the command and drives graphical data associated with the command to one or more frame buffers 66–69.

Figure 6:
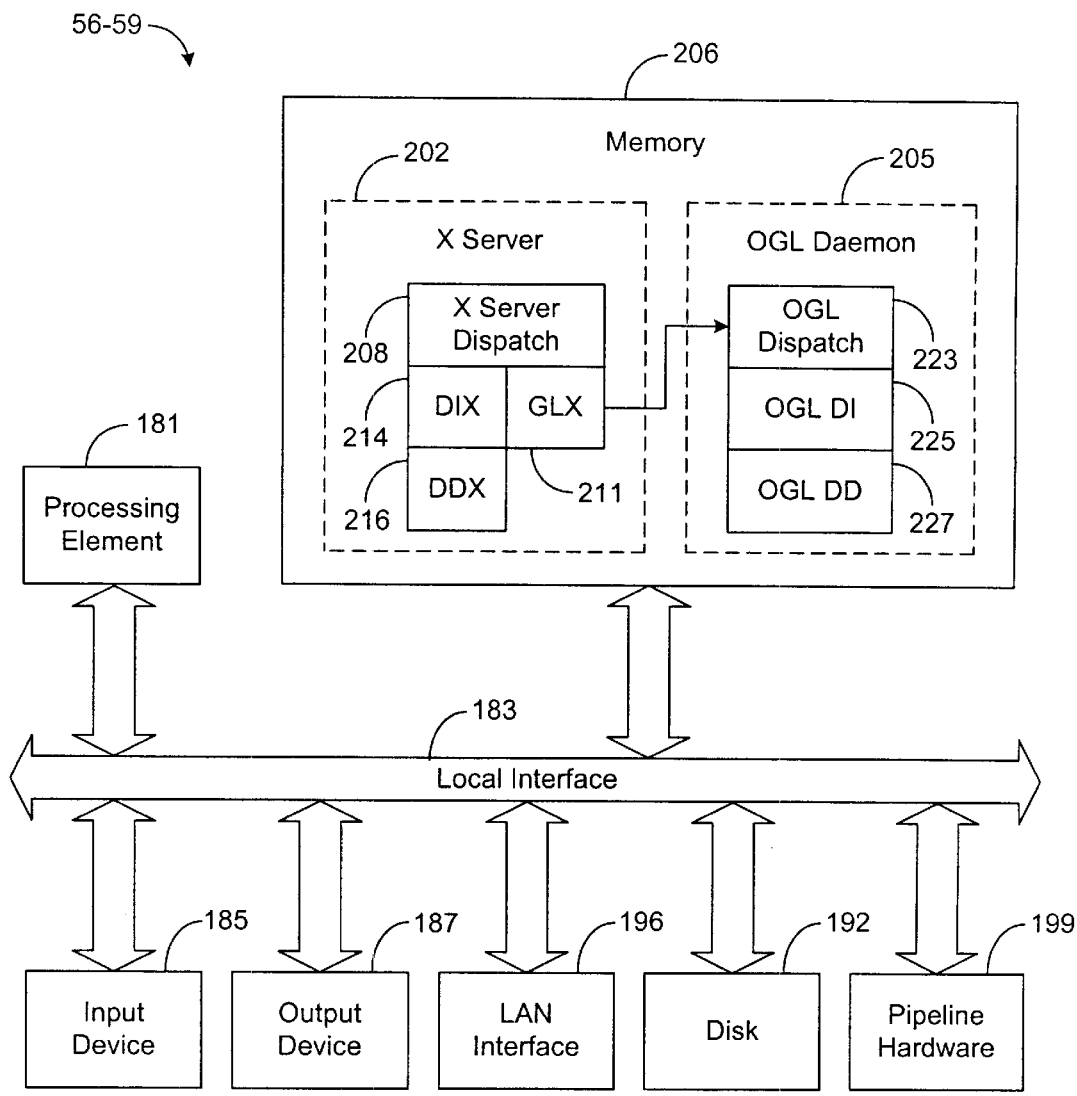
FIG. 6 is a block diagram illustrating a more detailed view of a slave pipeline depicted in FIG. 3.

In the preferred embodiment, each of slave pipelines 56–59 is configured according to FIG. 6, although other configurations of pipelines 56–59 in other embodiments are possible. As shown by FIG. 6, each slave pipeline 56–59 includes an X server 202, similar to the X server 162 previously described, and an OGL daemon 205. The X server 202 and OGL daemon 205 may be implemented in software, hardware, or a combination thereof, and in the embodiment shown by FIG. 6, the X server 202 and OGL daemon 205 are implemented in software and stored in memory 206. Similar to client 52 and master pipeline 55, each of the slave pipelines 56–59 includes one or more processing elements 181 that communicate to and drive the other elements within the pipeline 56–59 via a local interface 183, which can include one or more buses. Furthermore, an input device 185, for example, a keyboard or a mouse, can be used to input data from a user of the pipeline 56–59, and an output device 187, for example, a display device or a printer, can be used to output data to the user. A disk storage mechanism 192 can be connected to the local interface 183 to transfer data to and from a nonvolatile disk (e.g., magnetic, optical, etc.). Each pipeline 56–59 is preferably connected to a LAN interface 196 that allows the pipeline 56–59 to exchange data with the LAN 62.

Similar to X server 162, the X server 202 includes an X server dispatch layer 208, a GLX layer 211, a DIX layer 214, and a DDX layer 216. In the preferred embodiment, each command received by the slave pipelines 56–59 includes 3D graphical data, since the X server 162 of master pipeline 55 executes each X window command that does not include 3D graphical data. The X server dispatch layer 208 interfaces the 2D data of any received commands with DIX layer 214 and interfaces the 3D data of any received commands with GLX layer 211. The DIX and DDX layers 214 and 216 are configured to process or accelerate the 2D data and to drive the 2D data through pipeline hardware 166 to one of the frame buffers 66–69 (FIG. 3).

The GLX layer 211 interfaces the 3D data with the OGL dispatch layer 223 of the OGL daemon 205. The OGL dispatch layer 223 interfaces this data with the OGL DI layer 225. The OGL DI layer 225 and DD layer 227 are configured to process the 3D data and to accelerate or drive the 3D data through pipeline hardware 199 to one of the frame buffers 66–69 (FIG. 3). Thus, the 2D graphical data of a received command is processed or accelerated by the X server 202, and the 3D graphical data of the received command is processed or accelerated by the OGL daemon 205. For a more detailed description of the foregoing process of accelerating 2D data via an X server 202 and of accelerating 3D data via an OGL daemon 205, refer to U.S. patent application Ser. No. 09/138,456.

Preferably, the slave pipelines 56–59, based on inputs from the master pipeline 55, are configured to render 3D images based on the graphical data from master pipeline 55 according to one of three modes of operation: the optimization mode, the super sampling mode, and the jitter mode. In the optimization mode, each of the slave pipelines 56–59 renders a different portion of a 3D image such that the overall process of rendering the 3D image is faster. In the super sampling mode, each portion of a 3D image rendered by one or more of the slave pipelines 56–59 is super-sampled in order to increase quality of the 3D image via anti-aliasing. Furthermore, in the jitter mode, each of the slave pipelines 56–59 renders the same 3D image but slightly offsets each rendered 3D image with a different offset value. Then, the compositor 76 averages the pixel data of each pixel for the 3D images rendered by the pipelines 56–59 in order to produce a single 3D image of increased image quality. Each of the foregoing modes will be described in more detail hereafter.

Optimization Mode

Referring to FIG. 3, the operation and interaction of the client 52, the pipelines 55–59, and the compositor 76 will now be described in more detail according to a preferred embodiment of the present invention while the system 50 is operating in the optimization mode. In such an embodiment, the master pipeline 55, in addition to controlling the operation of the slave pipelines 56–59 as described hereinafter, is used to create and manipulate an X window to be displayed by the display device 83. Furthermore, each of the slave pipelines 56–59 is used to render 3D graphical data within a portion of the foregoing X window.

Figure 7:
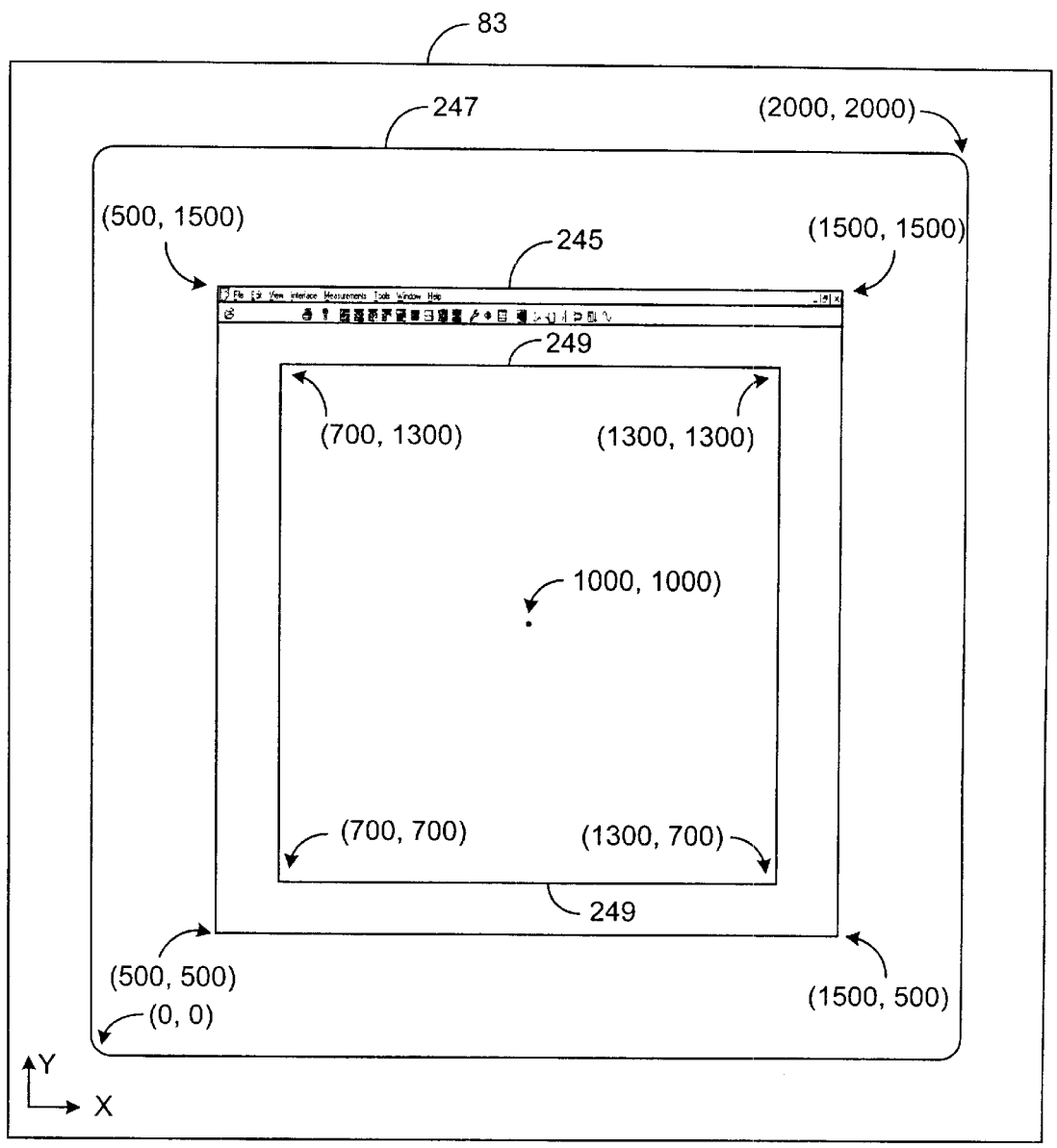
FIG. 7 is a diagram illustrating a more detailed view of a display device depicted in FIG. 3. The display device of FIG. 7 is displaying an exemplary X window having a center region for displaying three-dimensional objects.

For the purposes of illustrating the aforementioned embodiment, assume that the application 17 issues a function call (i.e., the client 52 via processing element 111 (FIG. 4) executes a function call within the application 17) for creating an X window having a 3D image displayed within the X window. FIG. 7 depicts a more detailed view of the display device 83 displaying such a window 245 on a display device screen 247. In the example shown by FIG. 7, the screen 247 is 2000 pixels by 2000 pixels ("2K×2K"), and the X window 245 is 1000 pixels by 1000 pixels ("1K×1"). The window 245 is offset from each edge of the screen 247 by 500 pixels. Assume that 3D graphical data is to be rendered in a center region 249 of the X window 245. This center region 249 is offset from each edge of the window 245 by 200 pixels in the embodiment shown by FIG. 7.

In response to execution of the function call by client 52, the application 17 transmits to the master pipeline 55 a command to render the X window 245 and a command to render a 3D image within portion 249 of the X window 245. The command for rendering the X window 245 should include 2D graphical data defining the X window 245, and the command for rendering the 3D image within the X window 245 should include 3D graphical data defining the 3D image to be displayed within region 249. Preferably, the master pipeline 55 renders 2D graphical data from the former command (i.e., the command for rendering the X window 245) to frame buffer 65 (FIG. 3) via X server 162 (FIG. 6).

The graphical data rendered by any of the pipelines 55–59 includes sets of values that respectively define a plurality of pixels. Each set of values includes at least a color value and a plurality of coordinate values associated with the pixel being defined by the set of values. The coordinate values define the pixel's position relative to the other pixels defined by the graphical data, and the color value indicates how the pixel should be colored. While the coordinate values indicate the pixel's position relative to the other pixels defined by the graphical data, the coordinate values produced by the application 17 are not the same coordinate values assigned by the display device 83 to each pixel of the screen 247. Thus, the pipelines 55–59 should translate the coordinate values of each pixel rendered by the pipelines 55–59 to the coordinate values used by the display device 83 to display images. Sometimes the coordinate values produced by the application 17 are said to be "window relative," and the aforementioned coordinate values translated from the window relative coordinates are said to be "screen relative." The concept of translating window relative coordinates to screen relative coordinates is well known, and techniques for translating window relative coordinates to screen relative coordinates are employed by most conventional graphical display systems.

In addition to translating coordinates of the 2D data rendered by the master pipeline 55 from window relative to screen relative, the master pipeline 55 in each mode of operation also assigns a particular color value, referred to hereafter as the "chroma-key," to each pixel within the region 249. The chroma-key indicates which pixels within the X window 245 may be assigned a color value of a 3D image that is generated by slave pipelines 56–59. In this regard, each pixel assigned the chroma-key as the color value by master server 55 is within region 249 and, therefore, may be assigned a color of a 3D object rendered by slave pipelines 56–59, as will be described in further detail hereafter. In the example shown by FIG. 7, the graphical data rendered by master pipeline 55 and associated with.screen relative coordinate values ranging from (700, 700) to (1300, 1300) are assigned the chroma-key as their color value by the master pipeline 55, since the region 249 is the portion of X window 245 that is to be used for displaying 3D images.

As shown by FIG. 5, the master pipeline 55 includes a slave controller 261 that is configured to provide inputs to each slave pipeline 56–59 over the LAN 62. The slave controller 261 may be implemented in software, hardware, or a combination thereof, and in the embodiment shown by FIG. 5, the slave controller 261 is implemented in software and stored in memory 206. The inputs from the slave controller 261 inform the slaves 56–59 of which mode each slave 56–59 should presently operate. In the present example, the slave controller 261 transmits inputs to each slave 56–59 indicating that each slave 56–59 should be in the optimization mode of operation. The inputs from slave controller 261 also indicate which portion of region 249 (FIG. 7) that is each slave's responsibility. For example, assume for illustrative purposes, that each slave 56–59 is responsible for rendering the graphical data displayed in one of the portions 266–269 shown by FIG. 8.

In this regard, assume that: (1) slave pipeline 56 is responsible for rendering graphical data defining the image displayed in portion 266 (i.e., screen relative coordinates (700, 1000) to (1000, 1300), (2) slave pipeline 57 is responsible for rendering graphical data defining the image displayed in portion 267 (i.e., screen relative coordinates (1000, 1000) to (1300, 1300), (3) slave pipeline 58 is responsible for rendering graphical data defining the image displayed in portion 268 (i.e., screen relative coordinates (700, 700) to (1000, 1000), and (4) slave pipeline 59 is responsible for rendering graphical data defining the image displayed in portion 269 (i.e., screen relative coordinates (1000, 700) to (1300, 1000). The inputs transmitted by the slave controller 261 to the slave pipelines 56–59 preferably indicate the range of screen coordinate values that each slave pipeline 56–59 is responsible for rendering.

Figure 9:
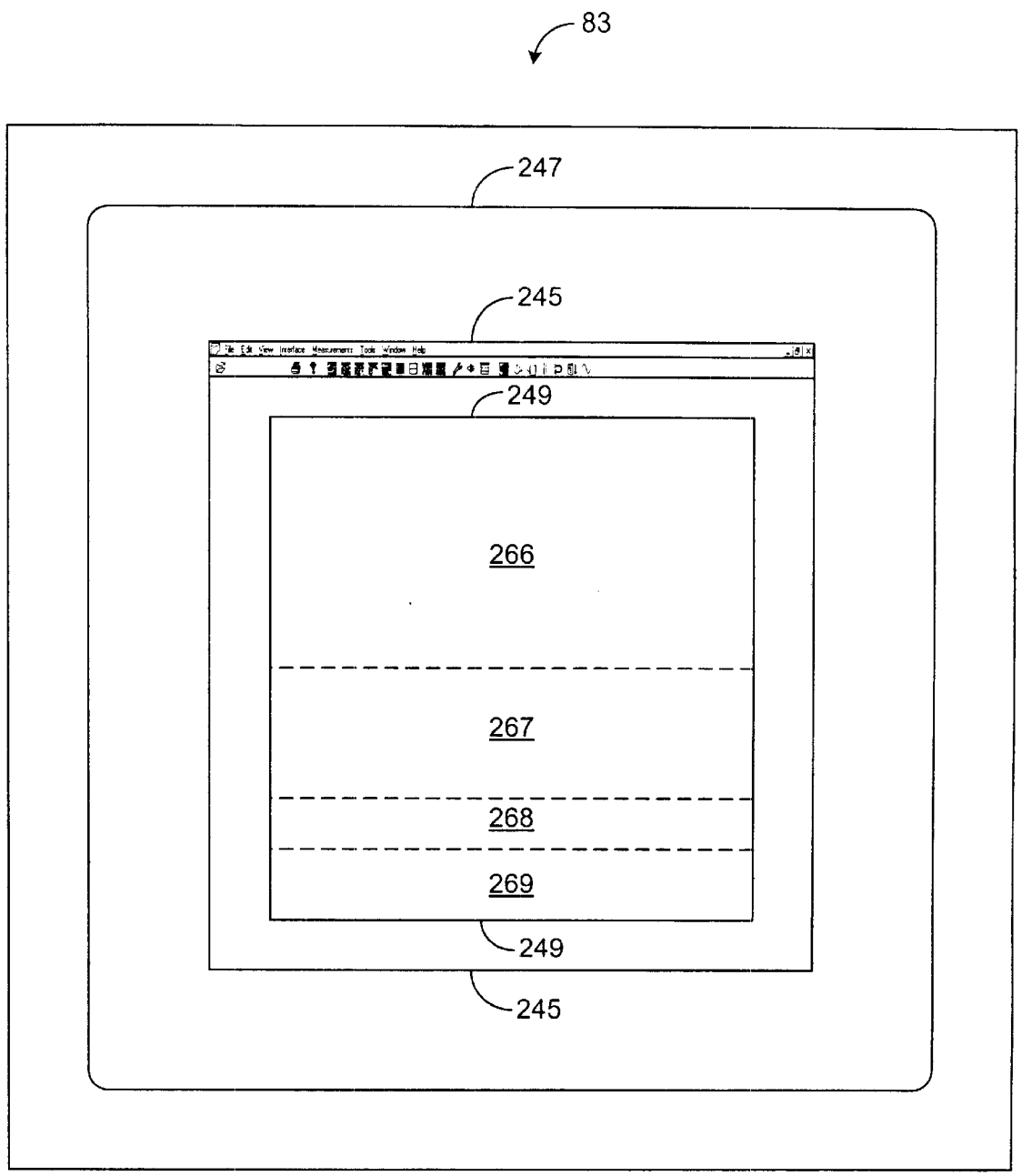
FIG. 9 is a diagram illustrating the display device depicted in FIG. 7 with the center region partitioned according to another embodiment of the present invention.

Note that the partition of the region 249 can be divided among the pipelines 56–59 via other configurations, and it is not necessary for each pipeline 56–59 to be responsible for an equally sized area of the region 249. For example, FIG. 9 shows an embodiment where each portion 266–269 represents a different sized horizontal area of the region 249.

Figure 8:
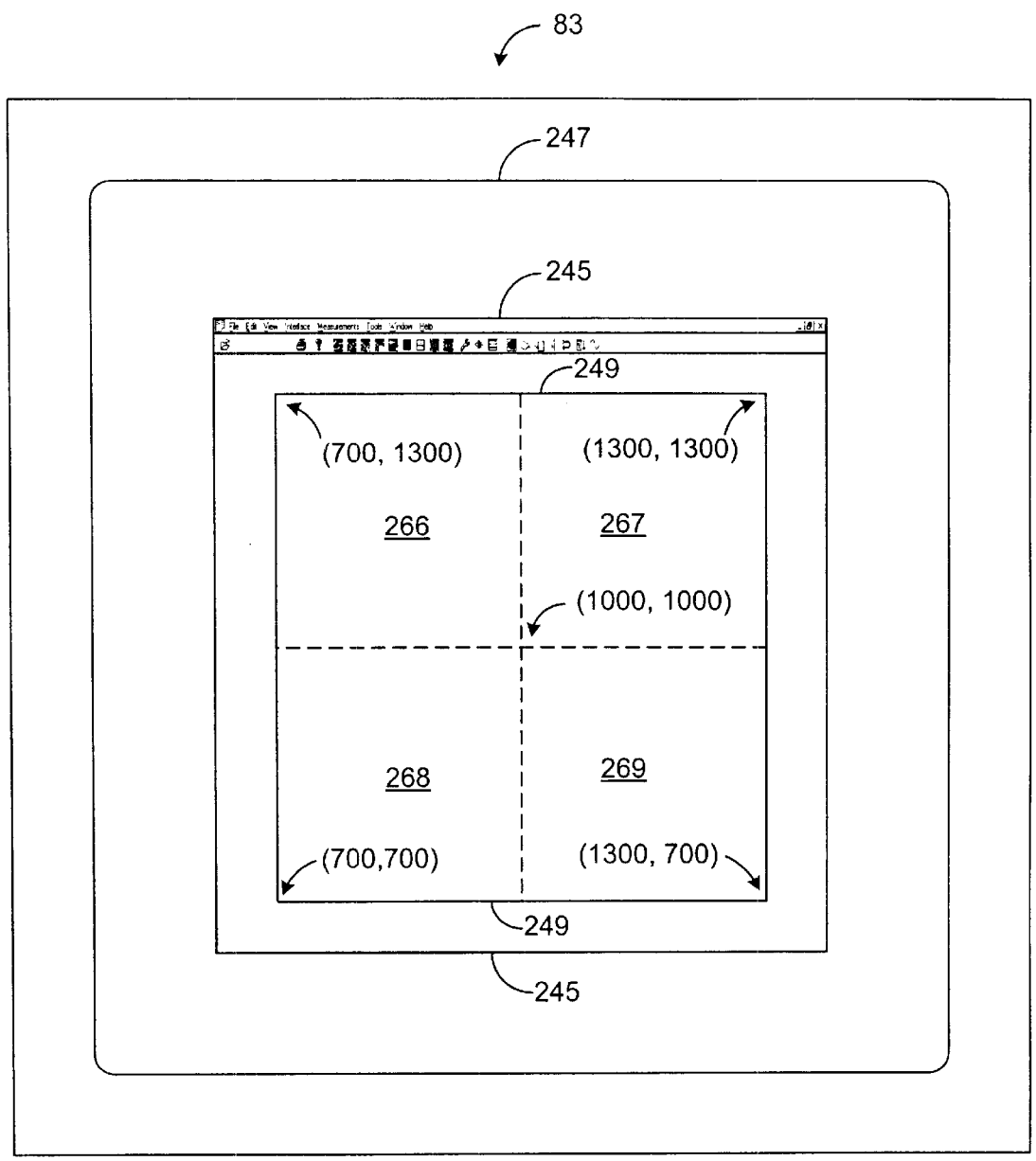
FIG. 8 is a diagram illustrating the display device depicted in FIG. 7 with the center region partitioned according to one embodiment of the present invention.

Each slave pipeline 56–59 is configured to receive from master pipeline 55 the graphical data of the command for rendering the 3D image to be displayed in region 249 and to render this data to frame buffers 66–69, respectively. In this regard, each pipeline 56–59 renders graphical data defining a 2D X window that displays a 3D image within the window. More specifically, slave pipeline 56 renders graphical data to frame buffer 66 that defines an X window displaying a 3D image within portion 266 (FIG. 8). The X server 202 within slave pipeline 56 renders the data that defines the foregoing X window, and the OGL daemon 205 within the slave pipeline 56 renders the data that defines the 3D image displayed within the foregoing X window. Furthermore, slave pipeline 57 renders graphical data to frame buffer 67 that defines an X window displaying a 3D image within portion 267 (FIG. 8). The X server 202 within slave pipeline 57 renders the data that defines the foregoing X window, and the OGL daemon 205 within the slave pipeline 57 renders the data that defines the 3D image displayed within the foregoing X window. Similarly, slave pipelines 58 and 59 render graphical data to frame buffers 68 and 69, respectively, via the X server 202 and the OGL daemon 205 within the pipelines 58 and 59.

Note that the graphical data rendered by each pipeline 56–59 defines a portion of the overall image to be displayed within region 249. Thus, it is not necessary for each pipeline 56–59 to render all of the graphical data defining the entire 3D image to be displayed in region 249. Indeed, in the preferred embodiment, each slave pipeline 56–59 preferably discards the graphical data that defines a portion of the image that is outside of the pipeline's responsibility. In this regard, each pipeline 56–59 receives from master pipeline 55 the graphical data that defines the 3D image to be displayed in region 249. Each pipeline 56–59, based on the aforementioned inputs received from slave controller 261 then determines which portion of this graphical data is within pipeline's responsibility and discards the graphical data outside of this portion.

For example, as described previously, slave pipeline 56 is responsible for rendering the graphical data defining the image to be displayed within portion 266 of FIG. 8. This portion 266 includes graphical data associated with screen relative coordinates (700, 1000) to (1000, 1300). Thus, any graphical data having screen relative coordinates outside of this range is discarded by the pipeline 56, and only graphical data having screen relative coordinates within the foregoing range is rendered to frame buffer 66.

Furthermore, slave pipeline 57 is responsible for rendering the graphical data defining the image to be displayed within portion 267 of FIG. 8. This portion 267 includes graphical data associated with screen relative coordinates (1000, 1000) to (1300, 1300). Thus, any graphical data having screen relative coordinates outside of this range is discarded by the pipeline 57, and only graphical data having screen relative coordinates within the foregoing range is rendered to frame buffer 67.

In addition, slave pipeline 58 is responsible for rendering the graphical data defining the image to be displayed within portion 268 of FIG. 8. This portion 268 includes graphical data associated with screen relative coordinates (700, 700) to (1000, 1000). Thus, any graphical data having screen relative coordinates outside of this range is discarded by the pipeline 58, and only graphical data having screen relative coordinates within the foregoing range is rendered to frame buffer 68.

Also, slave pipeline 59 is responsible for rendering the graphical data defining the image to be displayed within portion 269 of FIG. 8. This portion 269 includes graphical data associated with screen relative coordinates (1000, 700) to (1300, 1000). Thus, any graphical data having screen relative coordinates outside of this range is discarded by the pipeline 59, and only graphical data having screen relative coordinates within the foregoing range is rendered to frame buffer 69.

To increase the efficiency of the system 50, each slave pipeline 56–59 preferably discards the graphical data outside of the pipeline's responsibility before significantly processing any of the data to be discarded. Bounding box techniques may be employed to enable each pipeline 56–59 to quickly discard a large amount of graphical data outside of the pipeline's responsibility before significantly processing such graphical data.

In this regard, each set of graphical data transmitted to pipelines 56–59 may be associated with a particular set of bounding box data. The bounding box data defines a graphical bounding box that contains at least each pixel included in the graphical data that is associated with the bounding box data. The bounding box data can be quickly processed and analyzed to determine whether a pipeline 56–59 is responsible for rendering any of the pixels included within the bounding box. If the pipeline 56–59 is responsible for rendering any of the pixels included within the bounding box, then the pipeline 56–59 renders the received graphical data that is associated with the bounding box. However, if the pipeline 56–59 is not responsible for rendering any of the pixels included within the bounding box, then the pipeline 56–59 discards the received graphical data that is associated with the bounding box, and the pipeline 56–59 does not attempt to render the discarded graphical data. Thus, processing power is not wasted in rendering any graphical data that defines an object outside of the pipeline's responsibility and that can be discarded via the utilization of bounding box techniques as described above. Bounding box techniques are more fully described in U.S. Pat. No. 5,757,321, entitled "Apparatus and Method for Clipping Primitives Using Information from a Previous Bounding Box Process," which is incorporated herein by reference.

After the pipelines 56–59 have respectively rendered graphical data to frame buffers 65–69, the graphical data is read out of frame buffers 65–69 through conventional techniques and transmitted to compositor 76. Through techniques described in more detail hereafter, the compositor 76 is designed to composite or combine the data streams from frame buffers 65–69 into a single data stream and to render the data from this single data stream to display device 83.

Figure 10:
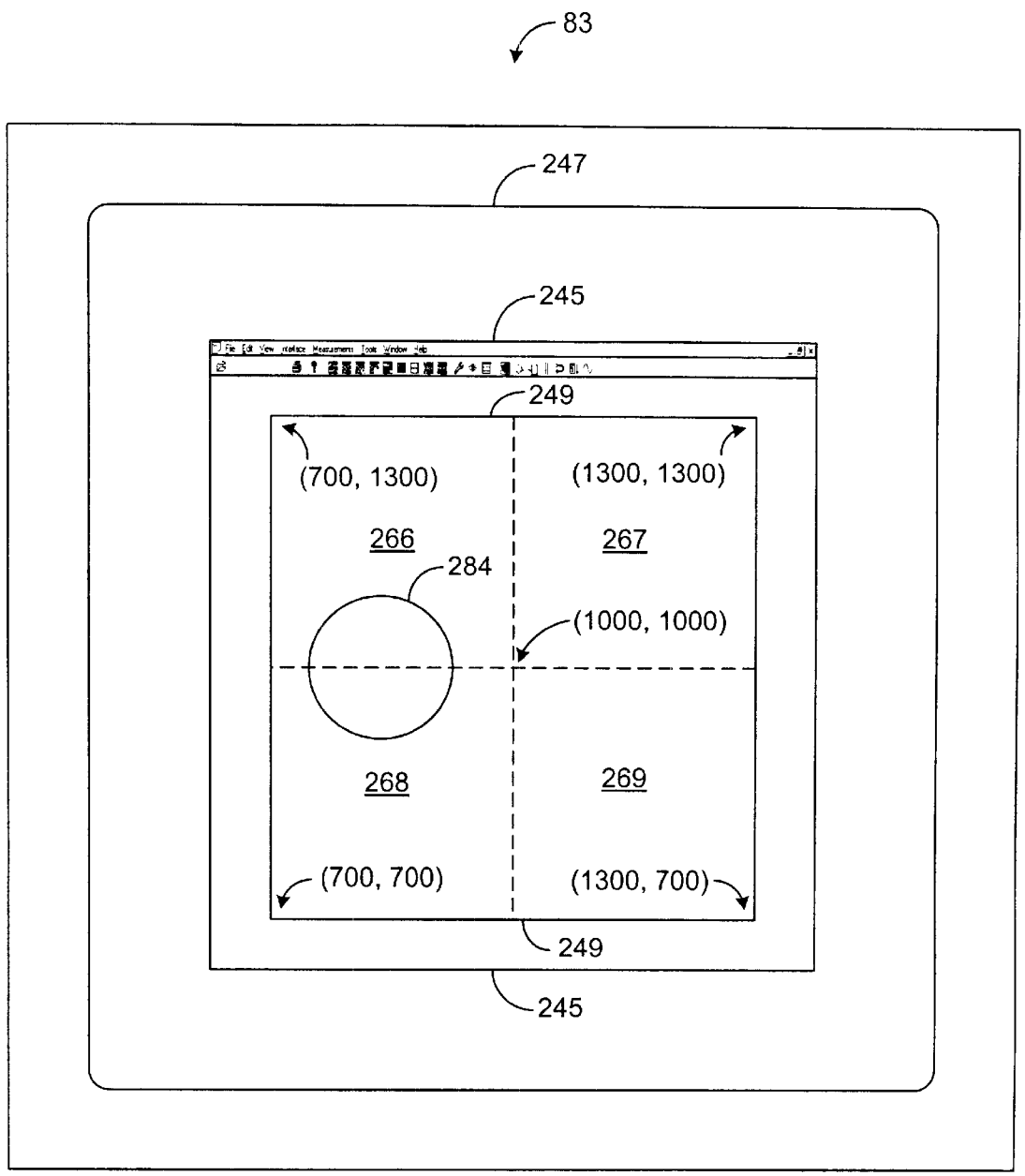
FIG. 10 is a diagram illustrating the display device depicted in FIG. 8 with a three-dimensional object displayed within the center region.

Once the graphical data produced by the application 17 has been rendered to display device 83, as described above, the display device 83 should display an image defined by the foregoing graphical data. This image may be modified by rendering new graphical data from the application 17 via the same techniques described hereinabove. For example, assume that it is desirable to display a new 3D object 284 on the screen 247, as shown by FIG. 10. In this example, assume that an upper half of the object 284 is to be displayed in the portion 266 and that a bottom half of the object is to be displayed in the portion 268. Thus, the object is not to be displayed in portions 267 and 269.

In the foregoing example, graphical data defining the object 284 is transmitted from client 52 to master pipeline 55. The master pipeline 55 transmits this graphical data to each of the slave pipelines 56–59. Since the object 284 is not to be displayed within portions 267 and 269, the screen coordinates of the object 284 should be outside of the ranges rendered by pipelines 57 and 59. Thus, slave pipelines 57 and 59 should discard the graphical data without rendering it to frame buffers 67 and 69. Preferably, bounding box techniques and/or other data optimization techniques are employed to discard the graphical data defining the object 284 before the coordinates of this graphical data are translated to screen relative by pipelines 57 and 59 and/or before other significant processing is performed on this data by pipelines 57 and 59.

Since the top half of the object 284 is to be displayed within portion 266, the screen coordinates of the object should be within the range rendered by pipeline 56 (i.e., from screen coordinates (700, 1000) to (1000, 1300)). Thus, slave pipeline 56 should render the graphical data defining the top half of the object 284 to frame buffer 66. However, since the bottom half of the object 284 is not to be displayed within portion 266, the screen coordinates of the bottom half of the object 284 should be outside of the range rendered by the pipeline 56. Thus, the slave pipeline 56 should discard the graphical data defining the bottom half of the object 284 without rendering this data to frame buffer 66. Preferably, bounding box techniques and/or other data optimization techniques are employed to discard the graphical data defining the bottom half of the object 284 before the coordinates of this graphical data are translated to screen relative by pipeline 56 and/or before other significant processing is performed on this data by pipeline 56.

Since the bottom half of the object 284 is to be displayed within portion 268, the screen coordinates of the object should be within the range rendered by pipeline 58 (i.e., from screen coordinates (700, 700) to (1000, 1000)). Thus, slave pipeline 58 should render the graphical data defining the bottom half of the object 284 to frame buffer 68. However, since the top half of the object 284 is not to be displayed within portion 268, the screen coordinates of the top half of the object 284 should be outside of the range rendered by the pipeline 58. Thus, the slave pipeline 58 should discard the graphical data defining the top half of the object 284 without rendering this data to frame buffer 68. Preferably, bounding box techniques and/or other data optimization techniques are employed to discard the graphical data defining the top half of the object 284 before the coordinates of this graphical data are translated to screen relative by pipeline 58 and/or before other significant processing is performed on this data by pipeline 58.

As described hereinbefore, the graphical data stored in frame buffers 65–69 should be composited by compositor 76 and rendered to display device 83. The display device 83 should then update the image displayed by the screen 247 such that the object 284 is displayed within portions 266 and 268, as shown by FIG. 10.

Since each pipeline 55–59 renders only a portion of the graphical data defining each image displayed by display device 83, the total time for rendering the graphical data to display device 83 can be significantly decreased, thereby resulting in increased efficiency for the system 50. Thus, in the optimization mode, the speed at which graphical data is rendered from the client 52 to the display device 83 should be maximized. This increase in efficiency is transparent to the application 17, in that the application 17 does not need to be aware of the configuration of the pipelines 55–59 to operate correctly. Thus, the application 17 does not need to be modified to operate successfully in either conventional system 15 or in the system 50 depicted by FIG. 3.

Super Sampling Mode

Referring to FIG. 3, the operation and interaction of the client 52, pipelines 55–59, and the compositor 76 will now be described in more detail while each of the pipelines 56–59 is operating in the super sampling mode. In the super sampling mode, the graphical data transmitted from the client 52 is super-sampled to enable anti-aliasing of the image produced by display device 83.

For illustrative purposes assume that the application 1 7, as described hereinabove for the optimization mode, issues a function call for creating an X window 245 having a 3D image displayed within the region 249 of the X window 245, as shown by FIG. 7. In the super sampling mode, the pipelines 55–59 perform the same functionality as in the optimization mode except for a few differences, which will be described in more detail hereinbelow. More specifically, the client 52 transmits to the master pipeline 55 a command to render the X window 245 and a command to render a 3D image within portion 249 of the X window 245. The command for rendering the X window 245 should include 2D Graphical data defining the X window 245, and the command for rendering the 3D image within the X window 245 should include 3D graphical data defining the 3D image to be displayed within region 249. The master pipeline 55 renders the 2D data defining the X window 245 to frame buffer 65 and transmits the 3D data defining the 3D image to slave pipelines 56–59, as described hereinabove for the optimization mode. The master pipeline 55 also assigns the chroma-key to each pixel that is rendered to frame buffer 65 and that is within portion 249.

The slave controller 261 transmits inputs to the slave pipelines 56–59 indicating the range of screen coordinate values that each slave 56–59 is responsible for rendering, as described hereinabove for the optimization mode. Each slave pipeline 56–59 discards the graphical data outside of the pipeline's responsibility, as previously described for the optimization mode. However, unlike in the optimization mode, the pipelines 56–59 super-sample the graphical data rendered by the pipeline 56–59 to frame buffers 66–69, respecively. In super sampling the graphical data, the number of pixels used to represent the image defined by the graphical data is increased. Thus, a portion of the image represented as a single pixel in the optimization mode is instead represented as multiple pixels in the super sampling mode. In other words, the image defined by the super-sampled data is blown up or magnified as compared to the image defined by the data prior to super sampling. The graphical data super-sampled by pipelines 56–59 is rendered to frame buffers 66–69, respectively.

The graphical data stored in frame buffers 65–69 is then transmitted to compositor 76, which then combines or composites the graphical data into a single data stream for display device 83. Before compositing or combining the graphical data, the compositor 76 first processes the super-sampled data received from frame buffers 66–69. More specifically, the compositor 76 reduces the size of the image defined by the super-sampled data back to the size of the image prior to the super sampling performed by pipelines 56–59. In reducing the size of the image defined by the super-sampled data, the compositor 76 averages or blends the color values of each set of super-sampled pixels that is reduced to a single pixel such that the resulting image defined by the processed data is anti-aliased.

As an example, assume that a portion of the graphical data originally defining a single pixel is super-sampled by one of the pipelines 56–59 into four pixels. When the foregoing portion of the graphical data is processed by compositor 76, the four pixels are reduced to a single pixel having a color value that is an average or a blend of the color values of the four pixels. By performing the super sampling and blending for each pixel defined by the graphical data transmitted to pipelines 56–59, the entire image defined by this data is anti-aliased. Note that super sampling of the single pixel into four pixels as described above is exemplary, and the single pixel may be super-sampled into numbers of pixels other than four in other examples. Further, any conventional technique and/or algorithm for blending pixels to form a jitter enhanced image may be employed by the compositor 76 to improve the quality of the image defined by the graphical data stored within frame buffers 66–69.

To better illustrate the operation of the system 50 in the super sampling mode, assume that the application 17 issues a command to display the 3D object 284 depicted in FIG. 10. In the this example, graphical data defining the object 284 is transmitted from client 52 to master pipeline 55. The master pipeline 55 transmits this graphical data to each of the slave pipelines 56–59. Since the object 284 is not to be displayed within portions 267 and 269, the screen coordinates of the object 284 should be outside of the ranges rendered by pipelines 57 and 59. Thus, slave pipelines 57 and 59 should discard the graphical data without rendering it to frame buffers 67 and 69. Preferably, bounding box techniques and/or other data optimization techniques are employed to discard the graphical data defining the object 284 before the coordinates of this graphical data are translated to screen relative by pipelines 57 and 59 and/or before other significant processing is performed on this data by pipelines 57 and 59.

Since the top half of the object 284 is to be displayed within portion 266, the screen coordinates of the object should be within the range rendered by pipeline 56 (i.e., from screen coordinates (700, 1000) to (1000, 1300)). Thus, slave pipeline 56 should render the graphical data defining the top half of the object 284 to frame buffer 66. However, since the bottom half of the object 284 is not to be displayed within portion 266, the screen coordinates of the bottom half of the object 284 should be outside of the range rendered by the pipeline 56. Thus, the slave pipeline 56 should discard the graphical data defining the bottom half of the object 284 without rendering this data to frame buffer 66. Preferably, bounding box techniques and/or other data optimization techniques are employed to discard the graphical data defining the bottom half of the object 284 before the coordinates of this graphical data are translated to screen relative by pipeline 56 and/or before other significant processing is performed on this data by pipeline 56.

In rendering the top half of the object 284, the pipeline 56 super-samples the data defining the top half of object 284 before storing this data in frame buffer 66. For illustrative purposes, assume that each pixel defining the top half of object 284 is super-sampled by pipeline 56 into four pixels.

Figure 11:
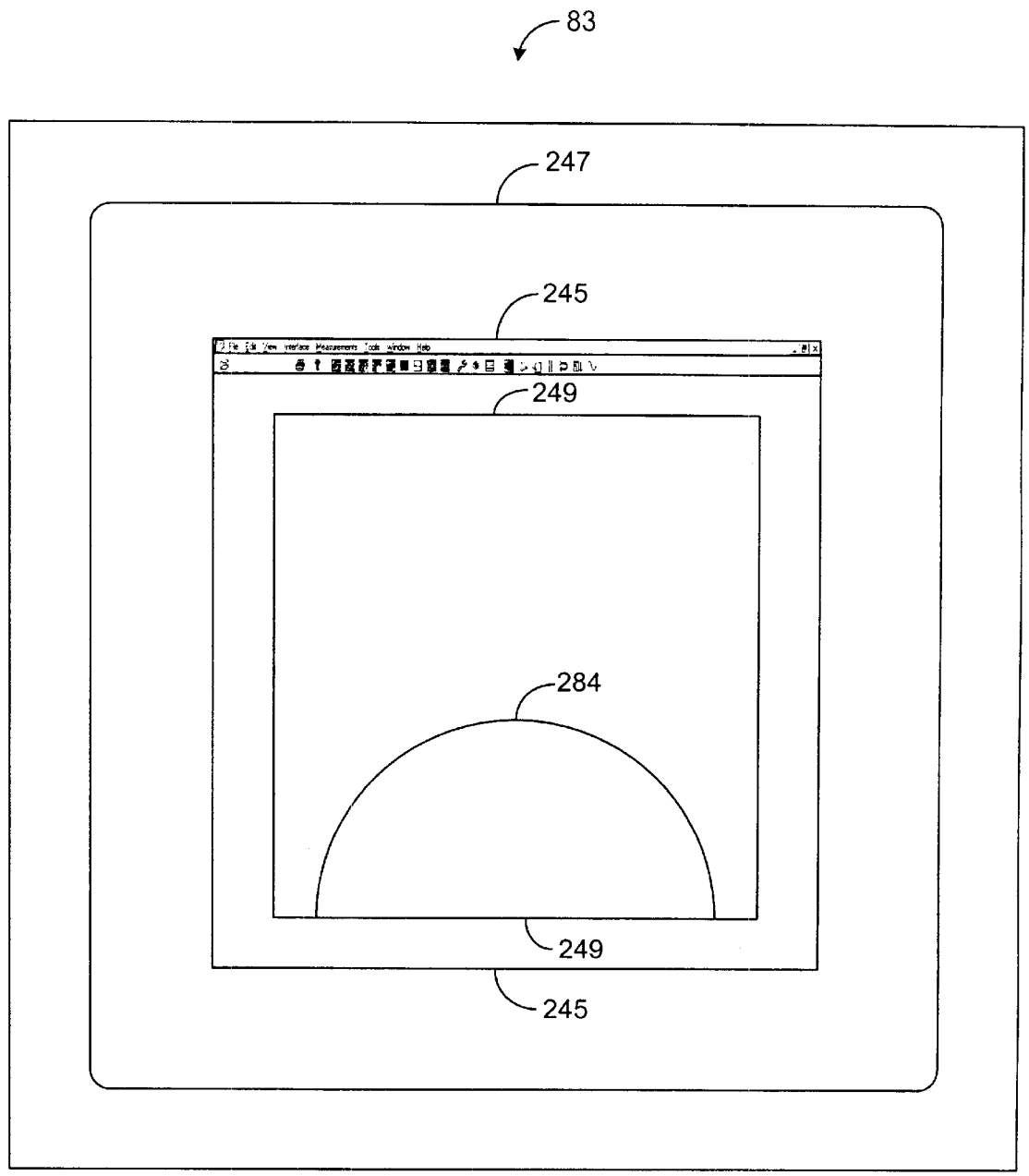
FIG. 11 is a diagram illustrating the display device depicted in FIG. 7 when super sampled data residing in one of the frame buffers interfaced with one of the slave pipelines is displayed within the center region of the display device.

Thus, if the super-sampled data stored in frame buffer 66 were somehow directly rendered in region 249 without the processing performed by compositor 76, the image displayed by display device 83 should appear to be magnified as shown in FIG. 11.

Since the bottom half of the object 284 is to be displayed within portion 268, the screen coordinates of the object should be within the range rendered by pipeline 58 (i.e., from screen coordinates (700, 700) to (1000, 1000)). Thus, slave pipeline 58 should render the graphical data defining the bottom half of the object 284 to frame buffer 68. However, since the top half of the object 284 is not to be displayed within portion 268, the screen coordinates of the top half of the object 284 should be outside of the range rendered by, the pipeline 58. Thus, the slave pipeline 58 should discard the graphical data defining the top half of the object 284 without rendering this data to frame buffer 68. Preferably, bounding box techniques and/or other data optimization techniques are employed to discard the graphical data defining the top half of the object 284 before the coordinates of this graphical data are translated to screen relative by pipeline 58 and/or before other significant processing is performed on this data by pipeline 58.

Figure 12:
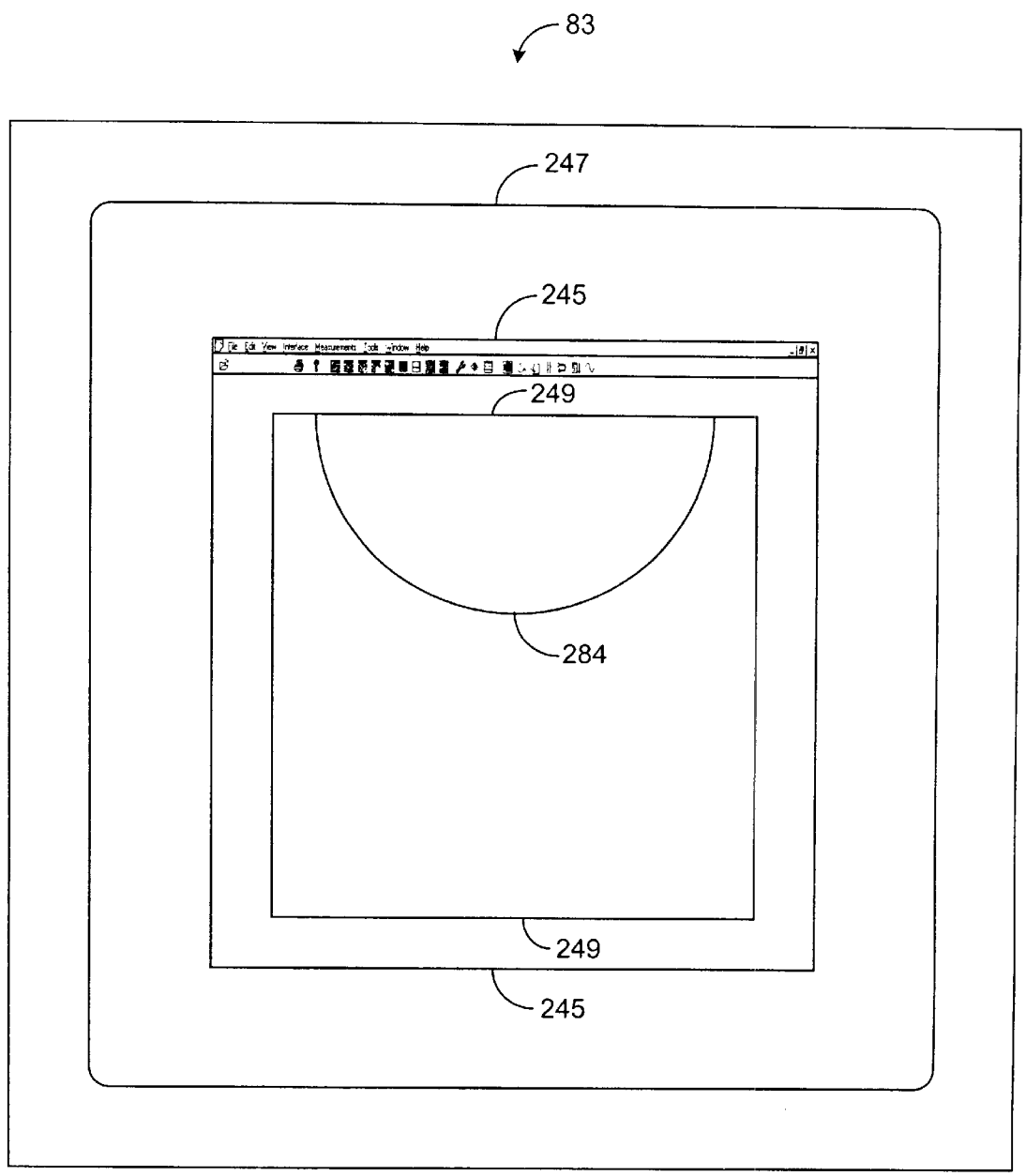
FIG. 12 is a diagram illustrating the display device depicted in FIG. 11 when super sampled data residing in another of the frame buffers interfaced with another of the slave pipelines is displayed within the center region of the display device.

In rendering the bottom half of the object 284, the pipeline 58 super-samples the data defining the bottom half of object 284 before storing this data in frame buffer 68. For illustrative purposes, assume that each pixel defining the bottom half of object 284 is super-sampled by pipeline 58 into four pixels. Thus, if the super-sampled data stored in frame buffer 68 were somehow directly rendered in region 249 without the processing performed by compositor 76, the image displayed by display device 83 should appear to be magnified as shown in FIG. 12.

The compositor 76 is configured to blend the graphical data in frame buffers 66–69 and to composite or combine the blended data and the graphical data from frame buffer 65 such that the screen 247 displays the image shown by FIG. 10. In particular, the compositor 76 blends into a single pixel each set of four pixels that were previously super-sampled from the same pixel by pipeline 56. This blended pixel should have a color value that is a weighted average or a blend of the color values of the tour super-sampled pixels. Furthermore, the compositor 76 also blends into a single pixel each set of four pixels that were previously super-sampled from the same pixel by pipeline 58. This blended pixel should have a color value that is a weighted average or a blend of the color values of the four super-sampled pixels. Thus, the object 284 should appear in anti-aliased form within portions 266 and 268, as depicted in FIG. 10.

The super sampling performed by pipelines 56–59 should improve the quality of the image displayed by display device 83. Furthermore, since each pipeline 56–59 is responsible for rendering only a portion of the image displayed by display device 83, similar to the optimization mode, the speed at which a super-sampled image is rendered to display device 83 can be maximized.

Jitter Mode

Referring to FIG. 3, the operation and interaction of the client 52, pipelines 55–59, and the compositor 76 will now be described in more detail while each of the pipelines 55–59 is operating in the jitter mode. In the jitter mode, each pipeline 56–59 is responsible for rendering the graphical data defining the entire 3D image to be displayed within region 249. Thus, each pipeline 56–59 refrains from discarding portions of the graphical data based on inputs received from slave controller 261, as described hereinabove for the optimization and super sampling modes. Instead, each pipeline 56–59 renders the graphical data for each portion of the image visible within the entire region 249.

However, each pipeline 56–59 adds a small offset to the coordinates of each pixel rendered by the pipeline 56–59. The offset applied to the pixel coordinates is preferably different for each different pipeline 56–59. The different offsets applied by the different pipelines 56–59 can be randomly generated by each pipeline 56–59 and/or can be pre-programmed into each pipeline 56–59. After the pipelines 56–59 have applied the offsets to the pixel coordinates and have rendered to frame buffers 66–69, respectively, the compositor 76 combines the graphical representation defined by the data in each frame buffer 66–69 into a single representation that is rendered to the display device 83 for displaying. In combining the graphical representations, the compositor 76 averages or blends the color values at the same pixel locations in frame buffers 66–69 into a single color value for the same pixel location in the final graphical representation that is to be rendered to the display device 83.

The aforementioned process of averaging multiple graphical representations of the same image should produce an image that has been jitter enhanced. The drawback to enhancing the image quality in this way is that each pipeline 56–59 renders the entire image to be displayed within region 249 instead of just a portion of such image as described in the optimization arid super sampling modes. Thus, the amount of time required to render the same image may be greater for the jitter mode as opposed to the optimization and super sampling modes. However, as compared to conventional systems 15 and 41, the amount of time required for the system 50 to render a jitter enhanced image should be significantly less than the amount of time required for either of the conventional systems 15 or 41 to produce the same jitter enhanced image.

In this regard, in performing jitter enhancing in a conventional system 15 or 41, a single pipeline 23 or 36–39 usually renders the graphical data defining an image multiple times to enable jitter enhancement to occur. Each time the pipeline 23 or 36–39 renders the graphical data, the pipeline 23 or 36–39 applies a different offset. However, in the present invention, a different offset is applied to the same graphical data via multiple pipelines 56–59. Therefore, to achieve the same level of jitter enhancement of an image, it is not necessary for each pipeline 56–59 of system 50 to render the graphical data defining the image the same number of times as the single conventional pipeline 23 or 36–39. Thus, the system 50 should be able to render an jitter enhanced image faster than conventional systems 15 and 41.

To better illustrate the operation of the system 50 in the jitter mode, assume that the application 17 issues a command to display the 3D object 284 depicted in FIG. 10. In this example, graphical data defining the object is transmitted from the client 52 to the master pipeline 55. The master pipeline 55 transmits this graphical data to each of the slave pipelines 56–59. Each of the slave pipelines 56–59 renders the graphical data defining the 3D object 284 to frame buffers 66–69, respectively. In rendering the graphical data each pipeline 56–59 adds a small offset to each set of coordinate values within the graphical data defining the object 284. The offset added by each pipeline 56–59 is preferably different and small enough such that the graphical representations of the object, as defined by frame buffers 66–69, would substantially but not exactly overlay one another, if each of these representations were displayed by the same display device 83.

As an example, pipeline 56 may add the value of 0.1 to each coordinate rendered by the pipeline 56, and pipeline 57 may add the value of 0.2 to each coordinate rendered by the pipeline 56. Further, pipeline 58 may add the value of 0 to each coordinate rendered by the pipeline 58, and the pipeline 59 may add the value of −0.2 to each coordinate rendered by the pipeline 59. Note that it is not necessary for the same offset to be added to each coordinate rendered by a particular pipeline 56–59. For example, one of the pipelines 56–59 could be configured to add the value of 0.1 to each x-coordinate value rendered by the one pipeline 56–59 and to add the value of 0.2 to each y-coordinate value and z-coordinate value rendered by the one pipeline 56–59.

The graphical data in frame buffers 66–69 is transmitted to compositor 76, which forms a single graphical representation of the object 284 based on each of the graphical representations from frame buffers 66–69. In this regard, the compositor 76 averages or blends into a single color value the color values of each pixel from frame buffers 66–69 having the same screen relative coordinate values. Each color value calculated by the compositor 76 is then assigned to the pixel having the same coordinate values as the pixels that were averaged or blended to form the color value calculated by the compositor 76.

As an example, assume that color values stored in frame buffers 66–69 for the pixel having the coordinate values (1000, 1000, 0) are a, b, c, and d, respectively, in which a, b, c, and d represent four different numerical values. In this example, the compositor 76 calculates a new color value, n, based on the following equation: $n=(a+b+c+d)/4$. This new color value, n, is then transmitted to display device 83 as the color value for the pixel having coordinates (1000, 1000, 0). Note that a different algorithm may be used to calculate the new color value and that different weightings may be applied to the values being averaged.

By performing the above-described process for each pixel represented in frame buffers 66–69, the compositor 76 produces graphical data defining a jitter enhanced image of the 3D object 284. This data is rendered to the display device 83 to display the jitter enhanced image of the object 284.

It should be noted that it is not necessary for each of the pipelines 56–59 to operate in only one mode of operation. For example, it is possible for the pipelines 56–59 to operate in both the optimization mode and the jitter mode. As an example, the region 249 could be divided into two portions according to the techniques described herein for the optimization mode. The pipelines 56 and 57 could be responsible for rendering graphical data within one portion of the region 249, and pipelines 58 and 59 could be responsible for rendering within the remaining portion of the region 249. Furthermore, the pipelines 56 and 57 could render jitter enhanced and/or anti-aliased images within their portion of region, and pipelines 58 and 59 could render jitter enhanced and/or anti-ailiased images within the remaining portion of region 249. The modes of pipelines 56–59 may mixed according to other combinations in other embodiments.

Furthermore, it is not necessary for the application 17 to be aware of which mode or combination of modes are being implemented by pipelines 55–59, since the operation of the application 17 is the same regardless of the implemented mode or combination of modes. In other words, the selection of the mode or modes implemented by the pipelines 55–59 can be transparent to the application 17.

It should be noted that there are a variety of methodologies that may be employed to enable the selection of the mode or modes performed by the system 50. In the preferred embodiment, a user is able to provide inputs via input device 115 of client 52 (FIG. 4) indicating which mode or modes the user would like the system 50 to implement. The client 52 is designed to transmit the user's mode input to master pipeline 55 over LAN 62. The.slave controller 261 of the master pipeline 55 (FIG. 5) is designed to then provide appropriate input to each slave pipeline 56–59 instructing each slave pipeline 56–59 which mode to implement based on the mode input received from client 52. The slave controller 261 also transmits control information to compositor 76 via connection 331 (FIG. 3) indicating which mode is being implemented by each pipeline 56–59. The compositor 76 then utilizes this control information to appropriately process the graphical data from frame buffers 76, as further described herein. There are various other methodologies and configurations that may be employed to provide the slave pipelines 56–59 and/or compositor 76 with the necessary mode information for enabling the pipelines 56–59 and compositor 76 to operate as desired. For example, the control information may be included in the data transmitted from the master pipeline 55 to the slave pipelines 56–59 and then from the slave pipelines 56–59 to the compositor 76.

It should be noted that master pipeline 55 has been described herein as only rendering 2D graphical data. However, it is possible for master pipeline 55 to be configured to render other types of data, such as 3D image data, as well. In this regard, the master pipeline 55 may also include an OGL daemon, similar to the OGL daemon 205 within the slave pipelines 56–59. The purpose for having the master pipeline 55 to only execute graphical commands that do not include 3D image data is to reduce the processing burden on the master pipeline 55, since the master pipeline 55 performs various functionality not performed by the slave pipelines 56–59. In this regard, executing graphical commands including only 2D image data is generally less burdensome than executing commands including 3D image data. However, it may be possible and desirable in some implementations to allow the master pipeline 55 to share in the execution of graphical commands that include 3D image data. Furthermore, it may also be possible and desirable in some implementations to allow the slave pipelines 56–69 to share in the execution of graphical commands that do not include 3D image data (e.g., commands that only include 2D graphical data).

Figure 13:
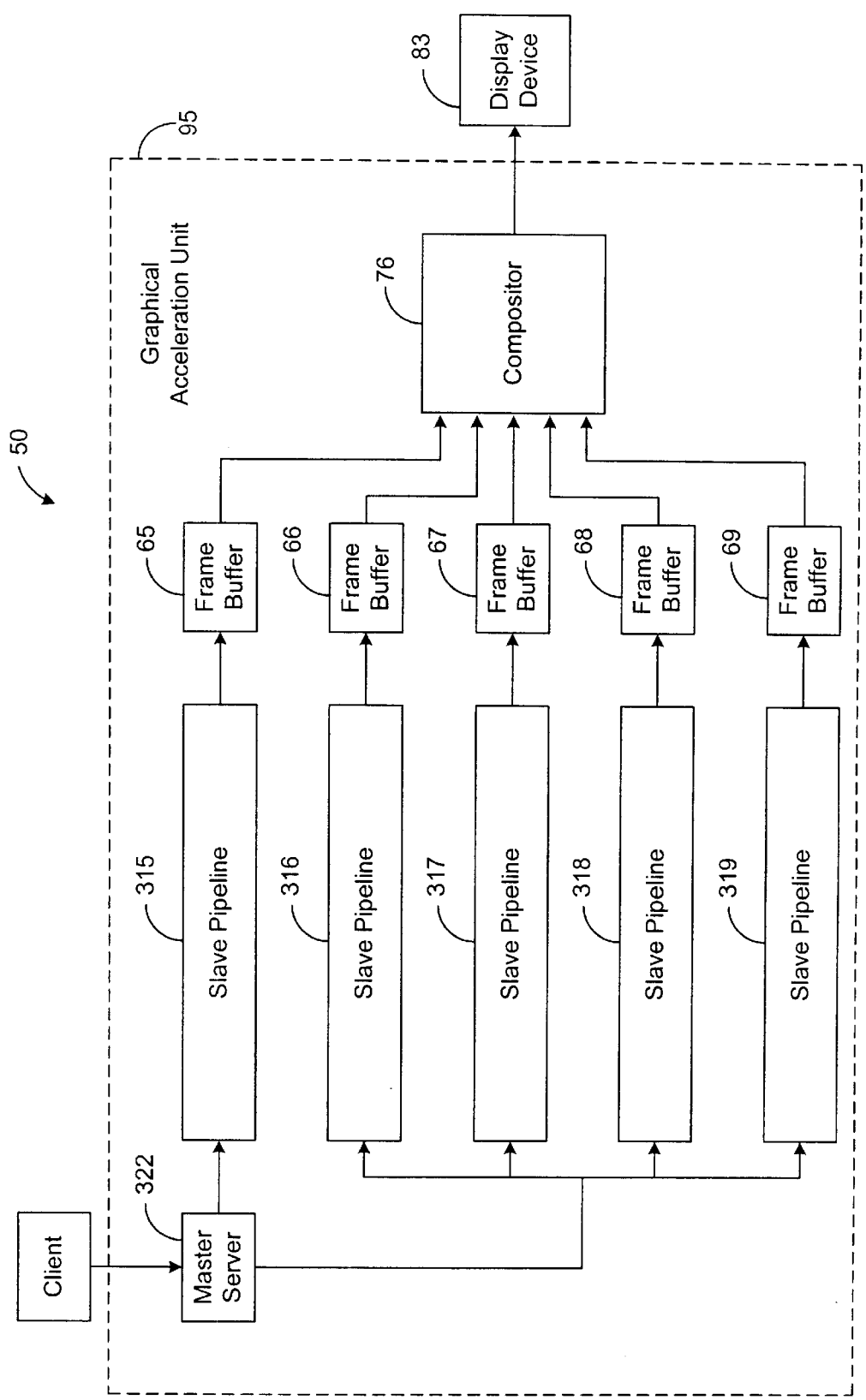
FIG. 13 is a block diagram illustrating another embodiment of the graphical display system depicted in FIG. 3.

In addition, a separate computer system may be used to provide the functionality of controlling the graphics pipelines. For example, FIG. 13 depicts another embodiment of the graphical acceleration unit 95. This embodiment includes multiple pipelines 315–319 configured to render data similar to pipelines 55–59, respectively. However, a separate computer system, referred to as master server 322, is employed to route graphical data received from client 52 to pipelines 315–319 and to control the operation of pipelines 315–319, similar to how slave control 261 of FIG. 5 controls the operation of pipelines 56–59. Other configurations may be employed without departing from the principles of the present invention. Furthermore, as previously set forth, it is not necessary to implement each pipeline 55–59 and the client 52 via a separate computer system. A single computer system may be used to implement multiple pipelines 55–59 and/or may be used to implement the client 52 and at least one pipeline 55–59.

It should be further noted that the present invention has been described as utilizing X Protocol and OpenGL Protocol to render graphical data. However, other types of protocols may be utilized without departing from the principles of the present invention.

Single Logical Screen Implementation

Figure 1:
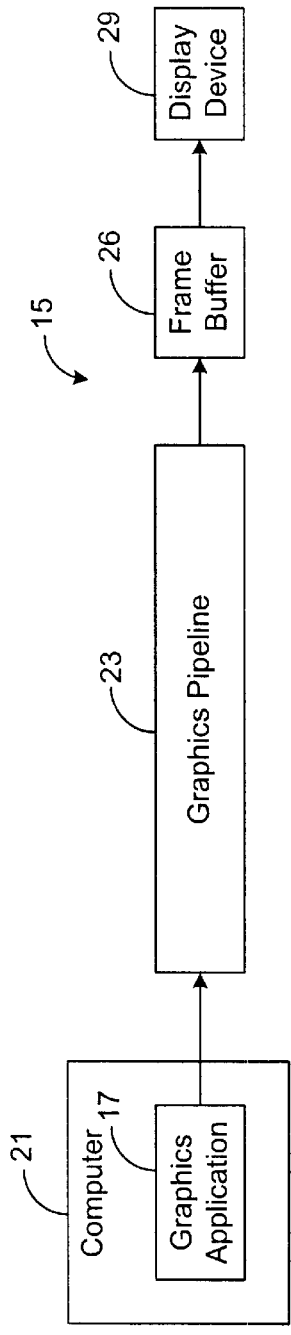
FIG. 1 is a block diagram illustrating a conventional graphical display system.
Figure 2:
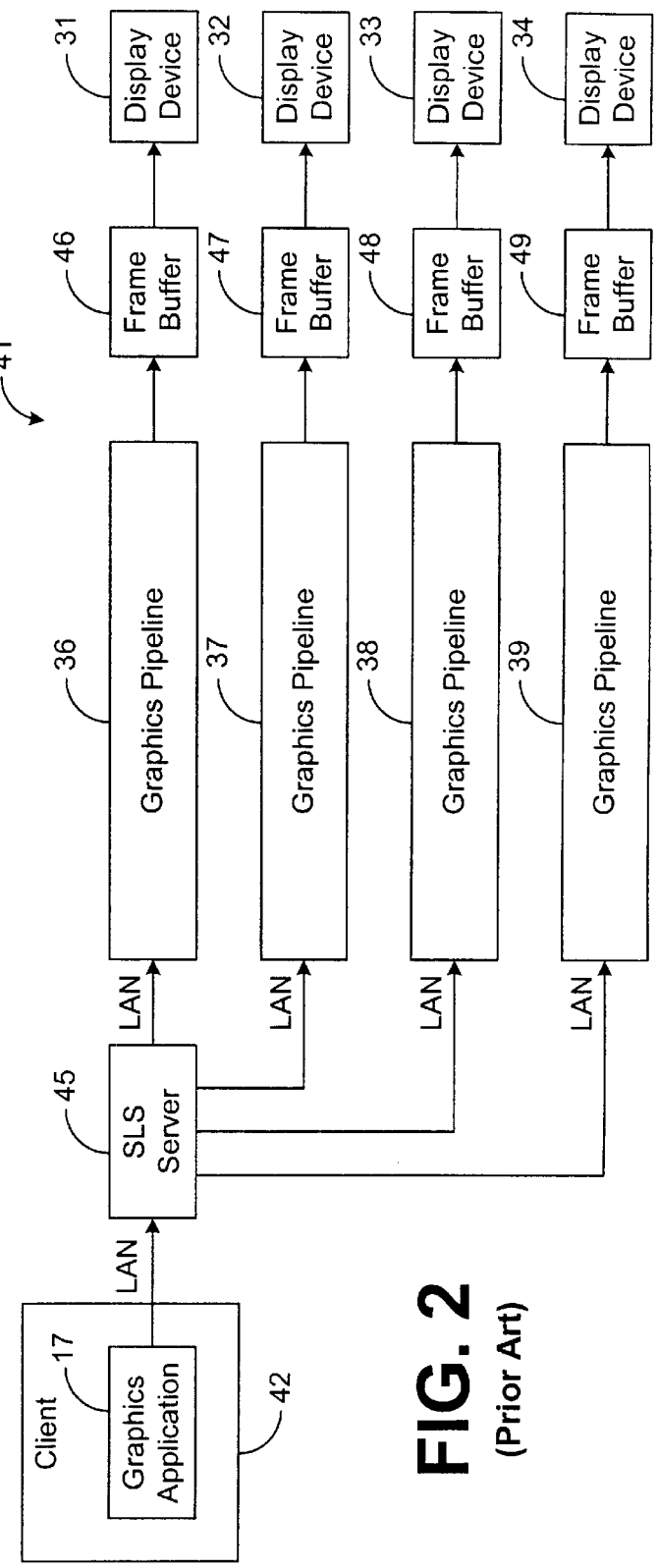
FIG. 2 is a block diagram illustrating a conventional single logical screen (SLS) graphical display system.
Figure 14:
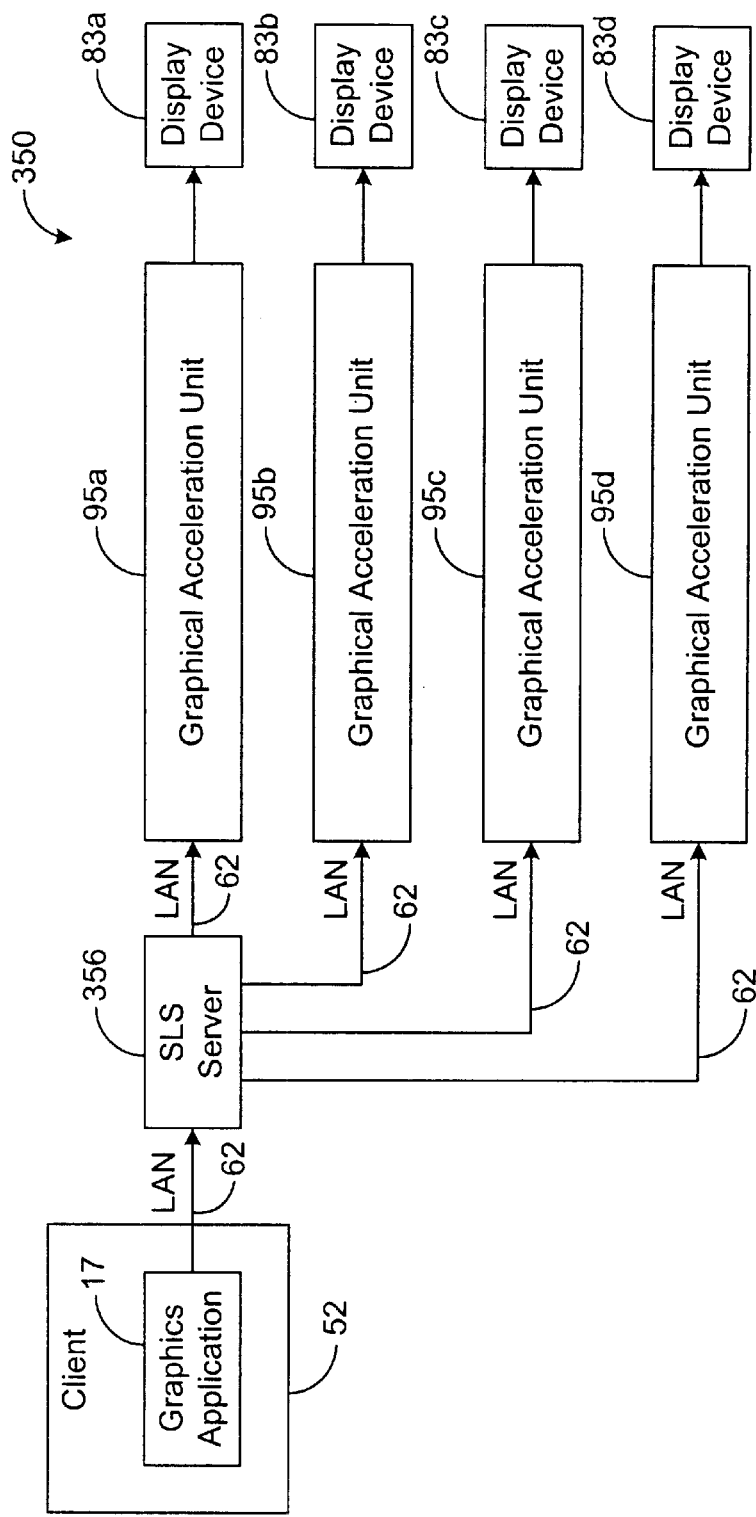
FIG. 14 is a single logical screen (SLS) graphical display system that utilizes a graphical acceleration unit depicted in FIG. 3 or FIG. 13.

The graphical acceleration unit 95 described herein may be utilized to implement a single logical screen (SLS)

graphical system, similar to the conventional system 41 shown in FIG. 2. As an example, refer to FIG. 14, which depicts an SLS graphical display system 350 in accordance with the present invention. The system 350 includes a client 52 storing the graphical application 17 that produces graphical data to be rendered, as described hereinabove. Any graphical command produced by the application 17 is preferably transmitted to SLS server 356, which may be configured similarly to the conventional SLS server 45 of FIG. 2. More specifically, the SLS server 356 is configured to interface each command received from the client 52 with multiple graphical acceleration units 95a–95d similar to how conventional SLS server 45 interfaces commands received from client 42 with each graphics pipeline 36–39. The SLS server 356 may be implemented in hardware, software, or a combination thereof, and in the preferred embodiment, the SLS server 356 is implemented as a stand-alone computer workstation or is implemented via a computer workstation that is used to implement the client 52. However, there are various other configurations that may be used to implement the SLS server 356 without departing from the principles of the present invention.

Each of the graphical acceleration units 95a–95d, according to the techniques described herein, is configured to render the graphical data received from SLS server 356 to a respective one of the display devices 83a–83d; Note that the configuration of each graphical acceleration unit 95a–95d may be identical to the graphical acceleration unit 95 depicted by FIG. 3 or FIG. 13, and the configuration of each display device 83a–83d may be identical to the display device 83 depicted in FIGS. 3 and 13. Moreover, an image defined by the graphical data transmitted from the application 17 may be partitioned among the display devices 83a–83d such that the display devices 83a–83d collectively display a single logical screen similar to how display devices 31–34 of FIG. 2 display a single logical screen.

Figure 15:
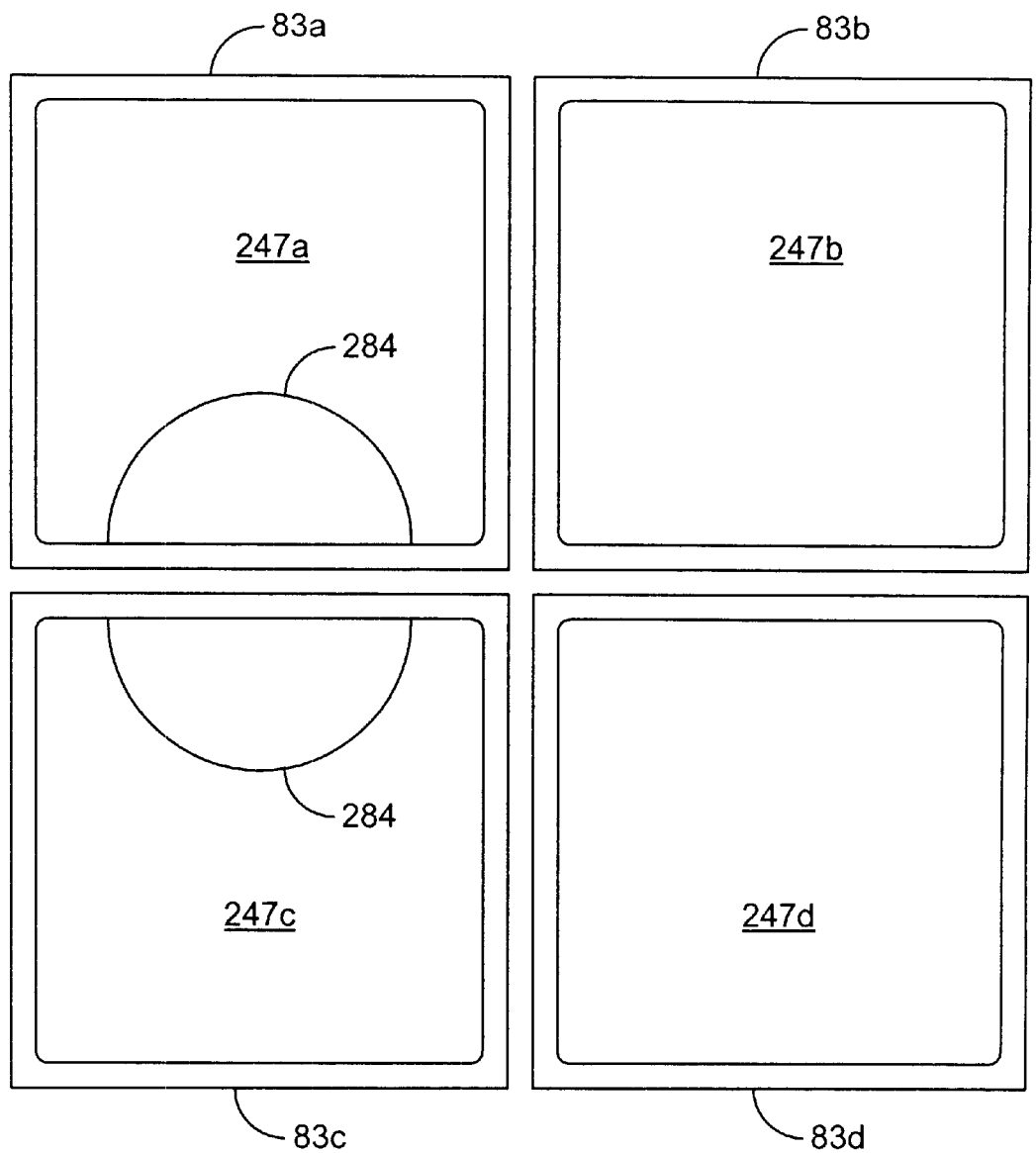
FIG. 15 is a diagram illustrating a more detailed view of display devices that are depicted in FIG. 14.

To better illustrate the operation of the system 350, assume that a user would like to display an image of the 3D object 284 (FIG. 10) via the display devices 83a–83d as a single logical screen. FIG. 15 depicts how the object 284 may be displayed by display devices 83a–83d in such an example. More specifically, in FIG. 15, the display device 83a displays the top half of the object 284, and the display device 83c displays the bottom half of the object 284.

In the foregoing example, the client 52 transmits a command for displaying the object 284. The command includes the graphical data defining the object 284 and is transmitted to SLS server 356. The SLS server 356 interfaces the command with each of the graphical acceleration units 95a–95d. Since the object 284 is not to be displayed by display devices 83b and 83d, the graphical acceleration units 95b and 95d fail to render the graphical data from the command to display devices 83b and 83d. However, graphical acceleration unit 95a renders the graphical data defining the top half of the object 284 to display device 83a, and graphical acceleration unit 95c renders the graphical data defining the bottom half of the object 284 to display device 83c. In response, the display device 83a displays the top half of the object 284, and the display device 83c displays the bottom half of the object 284, as shown by FIG. 15.

Note that the graphical acceleration units 95a and 95c may render their respective data based on any of the modes of operation previously described. For example, the master pipeline 55 (FIG. 3) of the graphical acceleration unit 95a preferably receives the command for rendering the object 284 and interfaces the graphical data from the command to slave pipelines 56–59 (FIG. 3) of the graphical acceleration unit 95a. These pipelines 56–59 may operate in the optimization mode, the super sampling mode and/or the jitter mode, as previously described hereinabove, in rendering the graphical data defining the top half of the object 284.

In addition, the master pipeline 55 (FIG. 3) of the graphical acceleration unit 95c preferably receives the command for rendering the object 284 and interfaces the graphical data from the command to slave pipelines 56–59 (FIG. 3) of the graphical acceleration unit 95c. These pipelines 56–59 may operate in the optimization mode, the super sampling mode, and/or the jitter mode, as previously described hereinabove, in rendering the graphical data defining the bottom half of the object 284.

Note that the master pipeline 55 (FIG. 3) of each graphical acceleration unit 95a–95d may employ bounding box techniques to optimize the operation of the system 350.

In particular, the master pipeline 55 (FIG. 3) may analyze bounding box data as previously described hereinabove to determine quickly whether the graphical data associated with a received command is to be rendered to the display device 83a–83d that is coupled to the unit 95a–95d. If the graphical data of the received command is not to be rendered to the display device 83a–83d coupled to the graphical acceleration unit 95a–95d, then the master server 55 of the graphical acceleration unit 95a–95d may be configured to discard the command before transmitting the graphical data of the command to any of the slave pipelines 56–59 and/or before performing any significant processing of the command. However, if any of the graphical data of the received command is to be rendered to the display device 83a–83d coupled to the graphical acceleration unit 95a–95d, then the unit 95a–95d can be configured to further process the command as described herein.

It should be noted that the system 350 can be scaled as needed in order to achieve a desired level of processing speed and/or image quality. In this regard, the number of graphical acceleration units 95a–95d and associated display devices 83a–83d can be increased or decreased as desired depending on how large or small of a single logical screen is desired. Further, the number of slave pipelines 56–59 (FIG. 3) within each graphical acceleration unit 95a–95d can be increased or decreased based on how much processing speed and/or image quality is desired for each display device 83a–83d. Note that the number of slave pipelines 56–59 within each unit 95a–95d does not have to be the same, and the modes and/or the combinations of modes implemented by each unit 95a–95d may be different.

Furthermore, in the embodiment shown by FIG. 3, mode inputs from the user were provided to the master pipeline 55, which controlled the mode of operation of the slave pipelines 55–59 and the compositor 76. In the embodiment shown by FIG. 14, such inputs may be similarly provided to the master pipeline 55 within each graphical acceleration unit 95a–95d via the client 52 and the SLS server 356. However, as previously set forth hereinabove, there are various other methodologies that may be employed to control the mode of operation of the pipelines 56–59 and the compositor 76.

The Compositor

Figure 16:
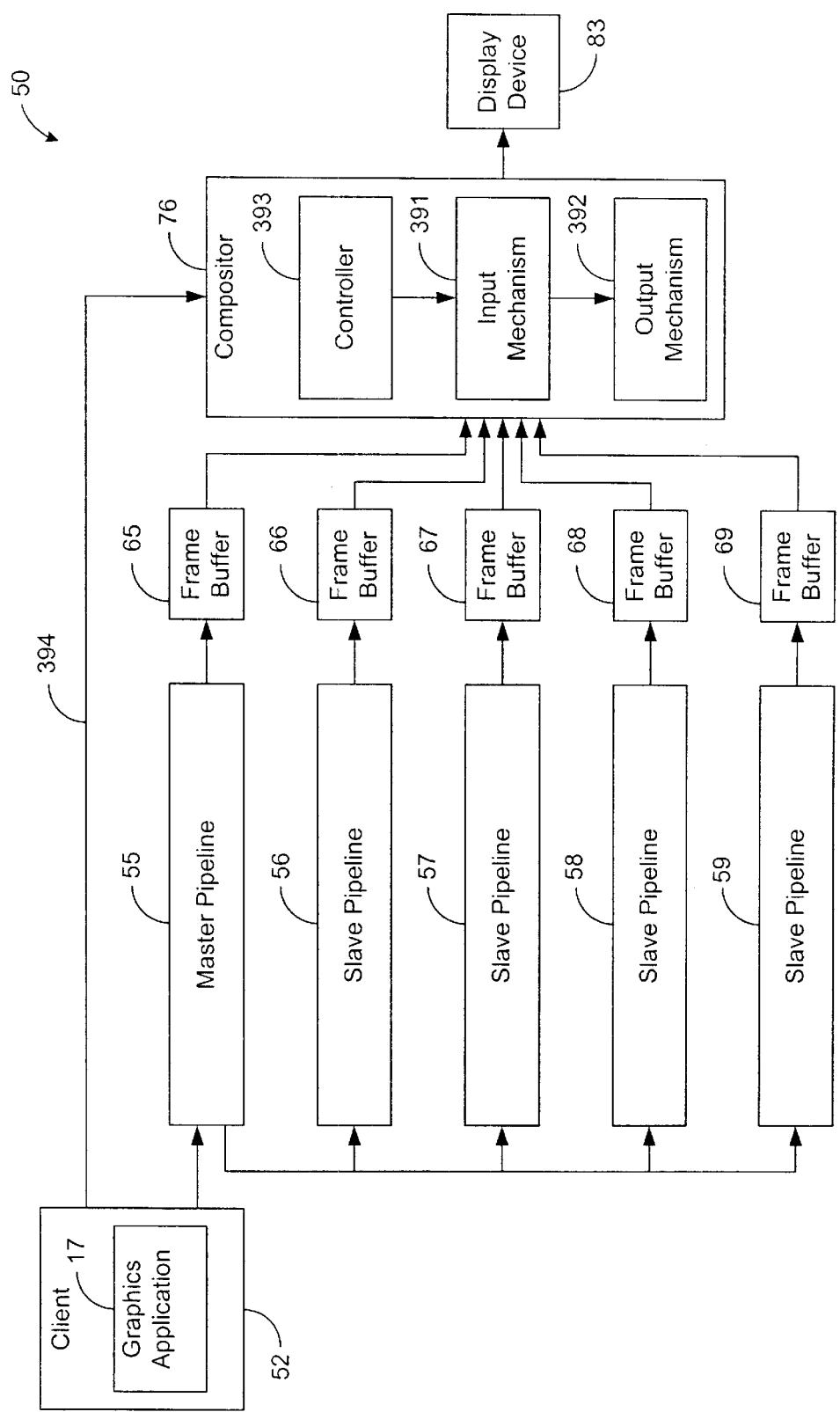
FIG. 16 is a block diagram illustrating a graphical display system in accordance with the present invention.

As mentioned briefly hereinbefore, the compositor may be employed by a computer graphical display system of the present invention. In this regard, computer graphical display system 50 (depicted in FIG. 16, for example) includes a client 52, a master graphical pipeline 55, and one or more slave graphical pipelines 55–59. The master pipeline 55 receives graphical data from an application 17 stored in the client 52. The master pipeline 55 preferably renders two dimensional (2D) graphical data to frame buffer 65 and routes three dimensional (3D) graphical data to slave pipelines 56–59, which render the 3D graphical data to frame buffers 66–69, respectively. The frame buffers 65–69 each output a stream of graphical data to the compositor 76, which is configured to composite or combine each of the data streams into a single, composite data stream. The composite data stream then may be provided to the display device 83, for example, for displaying an image thereon. A preferred embodiment of the compositor of the present invention will now be described in greater detail. Note that implementations for the compositor, other than the ones expressly described herein, may be employed to implement the graphical display system of the present invention.

Embodiments of the compositor and associated methodology of the present invention may be implemented in hardware, software, firmware, or a combination thereof. In a preferred embodiment, compositor 76 includes an input mechanism 391, an output mechanism 392, and a controller 393. As described in detail hereinafter, controller 393 enables input mechanism 391 to appropriately combine or composite the data streams from the various pipelines so as to provide a composite data stream which is suitable for rendering. In order to facilitate control of input mechanism 391, compositor 76 may receive control information from client 52, with such control information being provided to the controller 392 via a transmission media 394, such as a USB, for example, or one of the pipelines. FIG. 3 depicts an embodiment where the control information is provided to the compositor 76 over connection 331 from the master pipeline 55.

As embodiments of the compositor, components thereof, and associated functionality may be implemented in hardware, software, firmware, or a combination thereof those embodiments implemented at least partially in software can be adaptable to run on different platforms and operating systems. In particular, logical functions implemented by the compositor may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electro-magnetic, infrared, or semi-conductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Reference will now be made to the flowcharts of FIGS. 17 and 18, which depict functionality of preferred embodiments of the compositor. In this regard, each block of the flowcharts represents one or more executable instructions for implementing the specified logical function or functions. It should be noted that in some alternative implementations, the functions noted in the various blocks may occur out of the order depicted in the respective figures. For example, two blocks shown in succession in FIG. 18 may, in fact, be executed substantially concurrently where the blocks may sometimes be executed in the reverse order depending upon the functionality involved.

Figure 17:
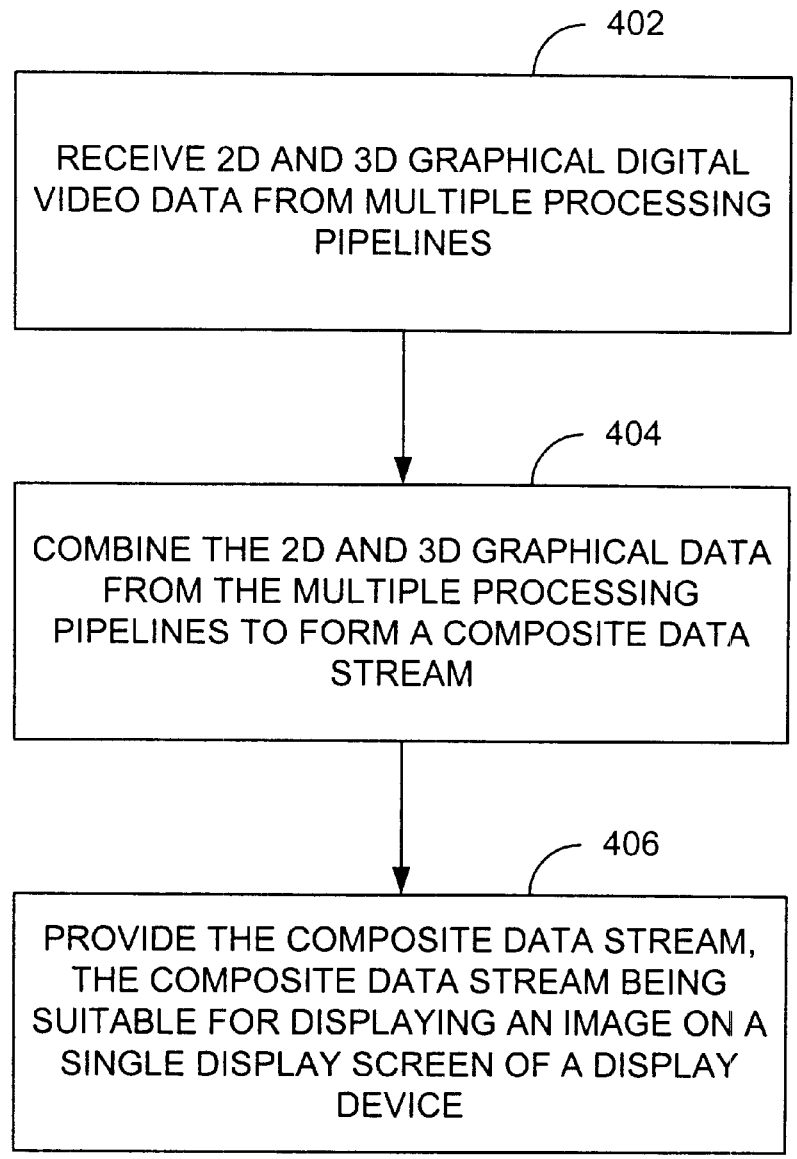
FIG. 17 is a flowchart illustrating functionality of a preferred embodiment of the compositor of the present invention.

Referring now to FIG. 17, the functionality of an embodiment of the compositor may be construed as beginning at block 402, where 2D and 3D graphical data relating to an image to be rendered, such as graphical data provided from multiple processing pipelines, for instance, are received. In block 404, the graphical data are combined to form a composite data stream containing data corresponding to the image. Thereafter, the compositor provides the composite data stream (block 406), which may be utilized by a single display device for displaying the image.

Figure 18:
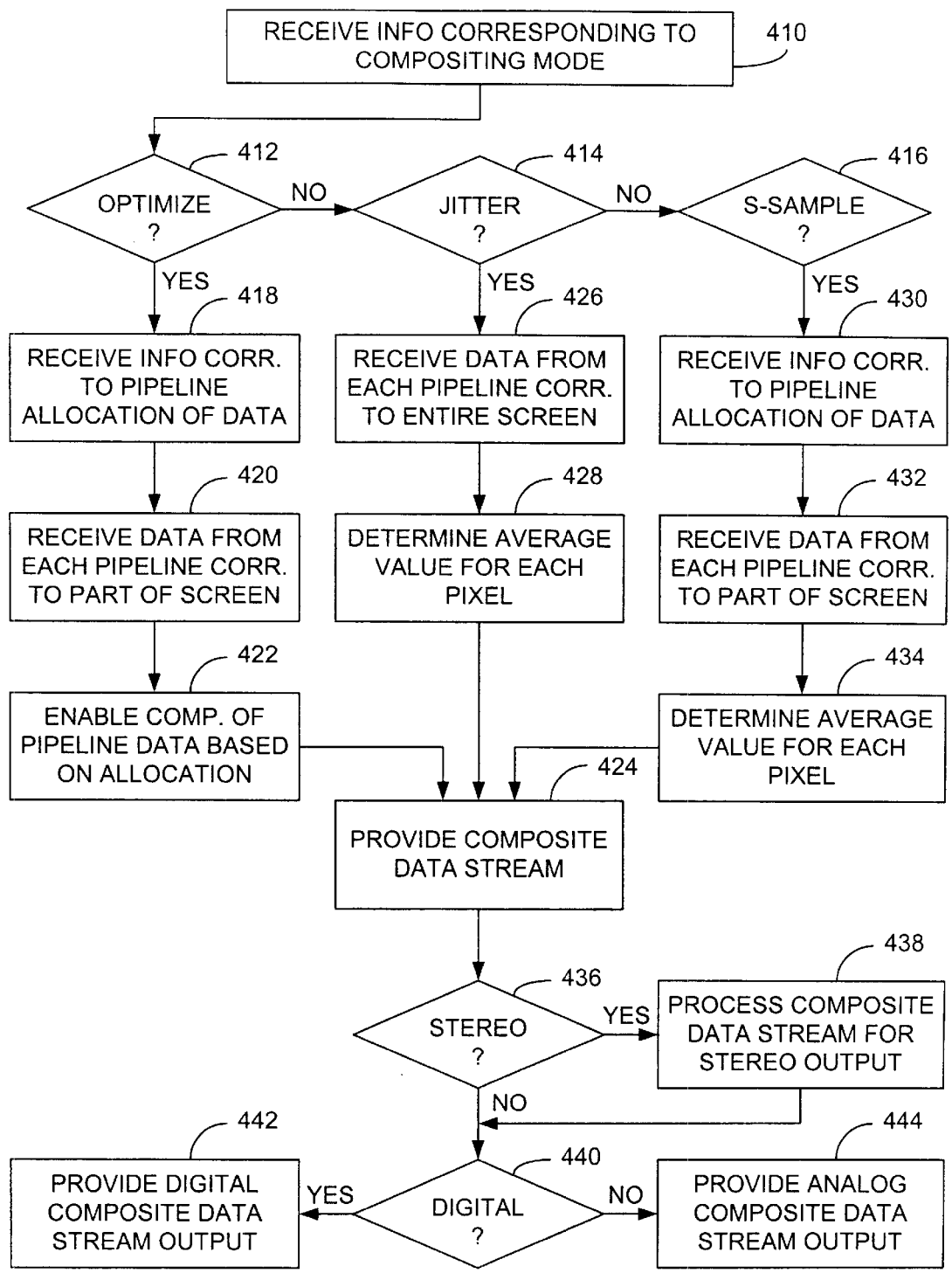
FIG. 18 is a flowchart illustrating functionality of a preferred compositor of the present invention.

In regard to the functionality or process depicted in FIG. 18, that process may be construed as beginning at block 410 where information corresponding to a particular compositing mode or format is received. Thereafter, such as depicted in blocks 412, 414 and 416, determinations are made as to whether the compositing mode information corresponds to one of an optimization mode (block 412), a jitter mode (block 414), or a super-sample mode (block 416).

If it is determined that the information corresponds to the optimization mode, the process may proceed to block 418 where information corresponding to the allocation of pipeline data is received. More specifically, in this mode, each graphical processing pipeline is responsible for processing information relating only to a portion of the entire screen resolution being processed. Therefore, the information corresponding to the allocation of pipeline data relates to which portion of the screen corresponds to which pipeline. Proceeding to block 420, data is received from each pipeline with the data from each pipeline corresponding to a particular screen portion. (It should be noted that the pipeline which processes the 2D graphical information may process such 2D graphical data for the entire screen resolution; thus, the description of blocks 418 and 420 relate most accurately to the processing of 3D graphical data). Thereafter, such as in block 422, compositing of pipeline data with regard to the aforementioned allocation of data is enabled. In block 424, a composite data stream, e.g., a data stream containing pixel data corresponding to the entire screen resolution (2000 pixels by 2000 pixels, for example) is provided.

If it is determined in block 414 that the information received in block 410 corresponds to the jitter or accumulate mode, the process may proceed to block 426 where pixel data from each pipeline corresponding the entire screen resolution, e.g., 2000 pixels by 2000 pixels, is received. Thereafter, such as in block 428, an average value for each pixel may be determined utilizing the pixel data from each of the pipelines. After block 428, the process may proceed to block 424, as described hereinbefore.

If it is determined in block 416 that the information received in block 410 corresponds to the super-sample mode, the process may proceed to block 430. As depicted therein, information corresponding to the allocation of pipeline data is received. For instance, the 3D graphical data may be equally divided among the pipelines designated for processing 3D data. Continuing with this representative example, each of the pipelines also may be allocated a screen portion corresponding to 1000 pixels by 1000 pixels. Thereafter, such as depicted in block 432, data is received from each pipeline that corresponds to the aforementioned screen portion allocation; however, the data of each pipeline has been super-sampled during processing so that the received data from each pipeline corresponds to a screen size that is larger than its screen portion allocation. For example, data from each pipeline may correspond to a screen resolution of 2000 pixels by 2000 pixels, e.g., each of the horizontal and vertical dimensions may be doubled. Thus, each pipeline provides four pixels of data for each pixel to be rendered. In other configurations, each of the pipelines may provide various other numbers of pixels of data for each pixel to be rendered.

Proceeding to block 434, the super-sampled data is then utilized to determine an average value for each pixel to be rendered by each pipeline. More specifically, since each pixel to be rendered previously was super-sampled into four pixels, determining an average value for each pixel preferably includes down-sampling each grouping of four pixels back into one pixel. Thus, in the aforementioned example, data from each pipeline is down-sampled and the data from each pipeline, which is representative of a portion of the entire screen resolution, is then composited in block 424, as describe hereinbefore.

After the composite data stream has been provided, such as depicted in block 424, a determination may then be made as to whether stereo output is desired (block 436). If it is determined that stereo processing is desired, the process may proceed to block 438 where stereo processing is facilitated (described in detail hereinafter). If is was determined in block 436 that stereo processing was not desired or, alternatively, after facilitating stereo processing in block 438, the process may proceed to block 440. As depicted in block 440, a determination may be made as to whether a digital video output is desired. If a digital video output is desired, the process may proceed to block 442 for appropriate processing. Alternatively, if an analog output is desired, the process may proceed to block 444 where the composite data stream may be converted to an analog data stream.

Figure 19:
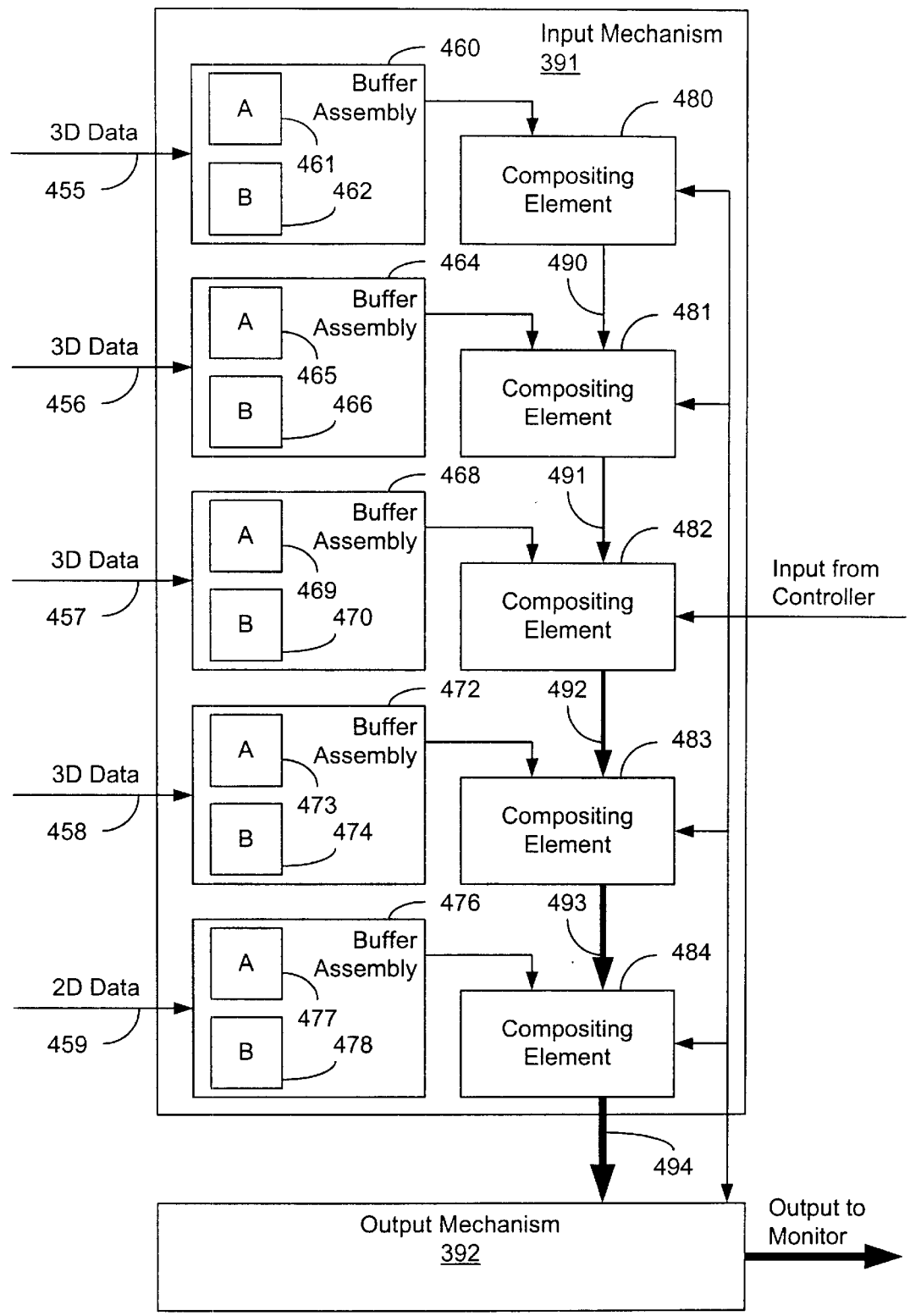
FIG. 19 is a block diagram illustrating a portion of a preferred embodiment of the compositor of the present invention.

Referring now to FIG. 19, which depicts a preferred embodiment of input mechanism 391 and output mechanism 392, input 391 mechanism is configured to receive multiple data streams, e.g., data streams 455–459. In particular the data streams are provided by pipelines, such as pipelines 55–59 of FIG. 11, with the data being intermediately provided to corresponding frame buffers, such as buffers 65–69. Each of the data streams 455–459 is provided to a buffer assembly of the input mechanism 391 that preferably includes two or more buffers, such as frame buffers or line buffers, for example. More specifically, in the embodiment depicted in FIG. 19, data stream 455 is provided to buffer assembly 460, which includes buffers 461 and 462, data stream 456 is provided to buffer assembly 464, which includes buffers 465 and 466, data stream 457 is provided to buffer assembly 468, which includes buffers 469 and 470, data stream 458 is provided to buffer assembly 472, which includes buffers 473 and 474, and data stream 459 is provided to buffer assembly 476, which includes buffers 477 and 478. Although data stream 459 is depicted as comprising 2D data, data which may be provided by the master pipeline, for instance, the 2D data may be provided to any of the frame buffer assemblies.

The buffers of each buffer assembly cooperate so that a continuous output stream of data may be provided from each of the buffer assemblies. More specifically, while data from a particular data stream is being written to one of the pair of buffers of a buffer assembly, data is being read from the other of the pair. In other embodiments, buffer assemblies may be provided with more than two buffers that are adapted to provide a suitable output stream of data. Additionally, in still other embodiments, the pipelines may provide pixel data directly to respective compositing elements without intervening buffers being provided therebetween.

In the embodiment depicted in FIG. 19, each of the frame buffer assemblies communicates with a compositing element. For example, buffer assembly 460 communicates with compositing element 480, buffer assembly 464 communicates with compositing element 481, buffer assembly 468 communicates with compositing element 482, buffer assembly 472 communicates with compositing element 483, and buffer assembly 476 communicates with compositing element 484. So configured, each buffer assembly is able to provide its respective compositing element with an output data stream.

Each compositing element communicates with an additional compositing element for forming the composite data stream. More specifically, compositing element 480 communicates with compositing element 481, compositing element 481 communicates with compositing element 482, compositing element 482 communicates with compositing element 483, and compositing element 483 communicates with compositing element 484. So configured, data contained in data stream 455 is presented to compositing element 480 via buffer assembly 460. In response thereto, compositing element 480 outputs data in the form of data stream 490, which is provided as an input to compositing element 481. Compositing element 481 also receives an input corresponding to data contained in data stream 456, via buffer assembly 464. Compositing element 481 then combines or composites the data provided from buffer assembly 464 and compositing element 480 and outputs a data stream 491. Thus, data stream 491 includes data corresponding to data streams 455 and 456. Compositing element 482 receives data stream 491 as well as data contained within data stream 457, which is provided to compositing element 482 via buffer assembly 468. Compositing element 482 composites the data from data stream 491 and data stream 457, and then outputs the combined data via data stream 492. Compositing element 483 receives data contained in data stream 492 as well as data contained within data stream 458, which is provided to compositing element 483 via frame buffer 472. Compositing element 483 composites the data from data stream 492 and data stream 458, and provides an output in the form of data stream 493. Data stream 493 is provided as an input to compositing element 484. Additionally, compositing element 484 receives data corresponding to data stream 459, which is provided via buffer assembly 476. Compositing element 484 then composites the data from data stream 459 and data stream 459, and provides a combined data stream output as composite data stream 494. Composite data stream 494 then is provided to output mechanism 392.

Compositing of the multiple data streams preferably is facilitated by designating portions of a data stream to correspond with particular pixel data provided by the aforementioned pipelines. In this regard, compositing element 480, which is the first compositing element to provide a compositing data stream, is configured to generate a complete frame of pixel data, i.e., pixel data corresponding to the entire resolution to be rendered. This complete frame of pixel data is provided by compositing element 480 as a compositing data stream. In response to receiving the compositing data stream, each subsequent compositing element may then add pixel data, i.e., pixel data corresponding to its respective pipeline, to the compositing data stream. After each compositing element has added pixel data to the compositing data stream, the data stream then contains pixel data corresponding to data from all of the aforementioned pipelines. Such a data stream, i.e., a data stream containing pixel data corresponding to data from all of the processing pipelines, may be referred to herein as a combined or composite data stream.

The first compositing element to provide pixel data to a compositing data stream, e.g., compositing element 480, also may provide video timing generator (VTG) functionality. Such VTG functionality may include, for example establishing horizontal scan frequency, establishing vertical scan frequency, and establishing dot clock, among others.

Generation of a composite data stream will now be described with reference to the schematic diagrams of FIGS. 10 and 19. As mentioned briefly hereinbefore in regard to FIG. 10, a particular slave pipeline is responsible for rendering graphical data displayed in each of screen portions 266–269. Additionally, 2D graphical information corresponding to the entire screen resolution, e.g., screen 247, is processed by a separate pipeline. For the purpose of the following discussion, graphical data associated with screen portion 266 corresponds to data stream 455 of FIG. 19, with screen portions 267, 268 and 269 corresponding to data streams 456, 457 and 458 respectively. Additionally, 2D graphical data, which is represented by window 245 of FIG. 10, corresponds to data stream 459 of FIG. 19.

As described hereinbefore, data streams 455–459 are provided to their respective buffer assemblies where data is written to one of the buffers of each of the respective buffer assemblies as data is read from the other buffer of each of the assemblies. The data then is provided to respective compositing elements for processing. More specifically, receipt of data by compositing element 480 initiates generation of an entire frame of data by that compositing element. Thus, in regard to the representative example depicted in FIG. 10, compositing element 480 generates a data frame of 2000 pixels by 2000 pixels, e.g., data corresponding to the entire screen resolution 247 of FIG. 10. Compositing element 480 also is programmed to recognize that data provided to it corresponds to pixel data associated with a particular screen portion, e.g., screen portion 266. Therefore, when constructing the frame of data corresponding to the entire screen resolution, compositing element 480 utilizes the data provided to it, such as via its buffer assembly, and appropriately inserts that data into the frame of data. Thus, compositing element 480 inserts pixel data corresponding to screen portion 266, i.e., pixels (700, 1300) to (1000, 1000), into the frame. Those pixels not corresponding to screen portion 266 may be represented by various other pixel information, as desired. For instance, in some embodiments, the data corresponding to remaining portions of the frame may be left as zeros, for example. Thereafter, the generated frame of data, which now includes pixel data corresponding to screen portion 266, may be provided from compositing element 480 as compositing data stream 490. Compositing data stream 490 then is provided to a next compositing element for further processing.

As depicted in FIG. 19, compositing data stream 490 is received by compositing element 481. Compositing element 481 also is configured to receive data from data stream 456, such as via buffer assembly 464, that may contain data corresponding to screen portion 267 of FIG. 10, for example.

Thus, compositing element 481 may receive data corresponding to pixels (1000, 1300) to (1300, 1000). Compositing element 481 is configured to insert the pixel data corresponding to pixels of screen portion 267 into the compositing data stream by replacing any data of the stream previously associated with, in this case, pixels (1000, 1300) to (1300, 1000), with data contained in data stream 456. Thereafter, compositing element 481 is able to provide a compositing data stream 491, which contains pixel data corresponding to the entire screen resolution as well as processed pixel data corresponding to pixels (700, 1300) to (1300, 1000), i.e., screen portions 266 and 267.

Compositing data stream 491 is provided to the next compositing element, e.g., compositing element 482. Additionally, compositing element 482 receives pixel data from data stream 457, such as via buffer assembly 468, that corresponds to screen portion 268. Compositing element 482 inserts pixel data from data stream 457 into the compositing data stream and provides a compositing data stream 492 containing data corresponding to the entire frame resolution as well as processed pixel data corresponding to screen portions 266, 267 and 268. Compositing data stream 492 then is provided to compositing element 483. Compositing element 483 receives pixel data from data stream 458, such as via buffer assembly 472, that corresponds to screen portion 269. Compositing element 483 inserts pixel data from data stream 458 into the compositing data stream. Thus, compositing element 483 is able to provide a compositing data stream 493 containing pixel data corresponding to the entire screen resolution as well as processed pixel data corresponding to pixels (700, 1300) to (1300, 700).

Compositing data stream 493 is provided to compositing element 484 which is adapted to receive 2D processed graphical data, such as via data stream 459 and its associated buffer assembly 476. Data stream 459, in addition to containing the 2D data, also includes a chroma-key value corresponding to pixels that are to be replaced by processed pixel data, e.g., 3D pixel data contained in compositing data stream 493. For example, the chroma-key value may be assigned a predetermined color value, such as a color value that typically is not often utilized during rendering. So provided, when pixel data corresponding to data stream 459 and pixel data from compositing stream 493 are received by compositing element 484, 2D pixel data is able to overwrite the pixel data contained within compositing data stream 493, except where the data corresponding to data stream 459 is associated with a chroma-key value. At those instances where a chroma-key value is associated with a particular pixel, the processed data from the compositing data stream remains as the value for that pixel, i.e., the processed data is not overwritten by the chroma-key value. Expressed in an alternative manner, pixel data from compositing data stream 493 is able to overwrite the pixel data corresponding to data stream 459 only where the pixel data corresponding to data stream 459 corresponds to the chroma-key value. So configured, compositing element 484 is able to provide a composite data stream 494 which includes pixel data corresponding to each of the processing pipelines.

As mentioned hereinbefore, the compositor may facilitate compositing of the various data streams of the processing pipelines in a variety of formats, such as super-sample, optimization, and jitter. In order to facilitate such compositing, each compositing element is configured to receive a control signal from the controller. In response to the control signal, each compositing element is adapted to combine its respective pixel data input(s) in accordance with the compositing format signaled by the controller. Thus, each compositing element is re-configurable as to mode of operation. Regardless of the particular compositing format utilized, however, such compositing preferably is facilitated by serially, iteratively compositing each of the input data streams so as to produce the composite data stream.

Compositing of data utilizing the super-sample mode will now be described in greater detail with reference to the embodiment depicted in FIG. 19. As mentioned hereinbefore, when operating in the super-sample or super-sampling mode, the graphical data, i.e., the number of pixels used to represent the image defined by the graphical data, provided from each of the processing pipelines to the compositor is increased. In particular, a portion of an image represented as a single pixel in the optimization mode is represented as multiple pixels in the super-sampling mode. Thus, the image defined by the super-sampled data is blown up or magnified as compared to the image defined by the data prior to super-sampling.

The super-sampled graphical data is provided to the compositor, which down-samples or filters the super-sampled data. More specifically, the compositor reduces the size of the image defined by the super-sampled data back to the original size of the image, e.g., the size of the image prior to the super-sampling function performed by the various pipelines. Reducing the size of the image preferably is performed by the buffer assemblies 460, 464, 468, 472 and 476, which average or blend the color values of each set of super-sampled pixels into a single pixel. By blending the color values of each set of super-sampled pixels into a single pixel, the resulting image is anti-aliased.

In a preferred embodiment, each of the aforementioned buffer assemblies receives a data stream from a processing pipeline, with the data stream containing data corresponding to multiple sets of super-sampled pixels. Thereafter, the data may be down-sampled and provided to respective compositing elements for compositing. For instance, buffer assembly 460 includes frame buffers 461 and 462, which are configured to alternately receive data from data stream 455 and provide data to the compositing element 480. So provided, buffer 461 may receive data corresponding to multiple sets of super-sampled pixels. Thereafter, the super-sampled pixel data may be down-sampled and provided to compositing element 480 for compositing. Alternatively, the data from data stream 455 may be down-sampled and then provided to buffer 461. Thereafter, the down-sampled data may be read from buffer 461 and provided to compositing element 480 for compositing. After providing down-sampled data from each of the buffer assemblies to the respective compositing elements, the compositor may combine the down-sampled data to produce the composite data stream as described hereinbefore.

Compositing of data utilizing the optimization mode will now be described in greater detail with reference to the embodiment depicted in FIG. 19. As discussed hereinbefore, the compositor receives graphical data from multiple pipelines. More specifically, in the optimization mode, each of the pipelines provides graphical data corresponding to a portion of an image to be rendered. Thus, in regard to the embodiment depicted in FIG. 19, buffer assemblies 460, 464, 468 and 472 receive 3D data corresponding to a portion of the image to be rendered, and buffer assembly 476 receives the 2D data.

After receiving data from the respective pipelines, the buffer assemblies provide the data to their respective compositing elements, which have been instructed, such as via control signals provided by the controller, to composite the data in accordance with the optimization mode. For instance, upon receipt of data from buffer assembly 460, compositing element 480 initiates generation of an entire frame of data, e.g., data corresponding to the entire screen resolution to be rendered. Compositing element 480 also inserts pixel data corresponding to its allocated screen portion into the frame and then generates compositing data stream 490, which includes data associated with an entire frame as well as processed pixel data corresponding to compositing element 480. The compositing data stream 490 then is provided to compositing element 481.

Compositing element 481, which also receives data from data stream 456, inserts pixel data corresponding to its allocated screen portion into the compositing data stream, such as by replacing any data of the stream previously associated with the pixels allocated to compositing element 481 with data contained in data stream 456. Thereafter, compositing element 481 provides a compositing data stream 491, which contains pixel data corresponding to the entire screen resolution as well as processed pixel data corresponding to compositing elements 480 and 481, to compositing element 482. Compositing element 482 also receives pixel data from data stream 457. Compositing element 482 inserts pixel data from data stream 457 into the compositing data stream and provides a compositing data stream 492, which contains data corresponding to the entire frame resolution as well as processed pixel data corresponding to compositing elements 480, 481, and 482. Compositing data stream 492 then is provided to compositing element 483, which inserts data into the compositing data stream corresponding to its allocated screen portion.

Compositing element 483 receives pixel data from data stream 458 and compositing data stream 492. Compositing element 483 inserts pixel data from data stream 458 into the compositing data stream and provides a compositing data stream 493, which contains data corresponding to the entire frame resolution as well as processed pixel data corresponding to compositing elements 480, 481, 482 and 483. Compositing data stream 493 then is provided to compositing element 484. Compositing element 484 receives compositing data stream 493, which includes 2D processed graphical data and chroma-key values corresponding to pixels that are to be replaced by processed 3D pixel data. Thus, in response to receiving the aforementioned data, compositing element 484 enables pixel data from compositing data stream 493 to overwrite the pixel data corresponding to data stream 459 where the pixel data corresponding to data stream 459 corresponds to the chroma-key value. Thereafter, compositing element 484 provides a composite data stream 494, which includes pixel data corresponding to the image to be rendered, to the output mechanism. The process may then be repeated for each subsequent frame of data.

Compositing of data utilizing the jitter or accumulate mode will now be described in greater detail with reference to the embodiment depicted in FIG. 19. As discussed hereinbefore, when processing data in the jitter mode, the data associated with each pipeline is offset with respect to the coordinates of the data processed by each of the other pipelines. In.some embodiments, the data of each of the pipelines may correspond to the entire screen resolution to be rendered, while in other embodiments, the data of several of the pipelines may correspond to an allocated portion of the entire screen resolution. In regard to the embodiment depicted in FIG. 19, buffer assemblies 460, 464, 468 and 472 receive 3D data corresponding to the entire image to be rendered, with each of those "images" being offset with respect to each other, and buffer assembly 476 receives the 2D data.

After receiving data from the respective pipelines, the buffer assemblies provide the data to their respective compositing elements, which have been instructed, such as via control signals provided by the controller, to composite the data in accordance with the jitter mode. For instance, upon receipt of data from buffer assembly 460, compositing element 480 initiates generation of an entire frame of data, e.g., data corresponding to the entire screen resolution to be rendered. As described in relation to compositing of data in the optimization mode, compositing element 480 inserts pixel data corresponding to its allocated screen portion into the frame; however, in the jitter mode, the allocated screen portion of compositing element 480 (as well as the other compositing elements) may correspond to the entire screen resolution. Compositing element 480 then generates compositing data stream 490, which includes data associated with an entire frame as well as processed pixel data corresponding to compositing element 480. The compositing data stream 490 then is provided to compositing element 481.

Compositing element 481, which also receives data from data stream 456, inserts pixel data corresponding to the entire screen, i.e., pixel data corresponding to the entire screen at a preselected coordinate offset, into the compositing data stream. For instance, compositing element 481 may accumulate the data for each pixel of the entire screen, with the accumulated pixel data then being provided as a compositing data stream 491. More specifically, compositing data stream 491 may contain pixel data corresponding to the entire screen resolution as received by compositing element 480, with pixel data corresponding to the entire screen resolution as received by compositing element 481 being added thereto. As described hereinafter, a blending of the color values of each of the pixels may be attained by determining an average color value, e.g., a weighted average of the color values provided for a given pixel by the pipelines, such as by discarding a portion of the accumulated pixel data.

In addition to receiving compositing data stream 491, compositing element 482 receives pixel data from data stream 457. Compositing element 482 inserts pixel data from data stream 457 into the compositing data stream and provides a compositing data stream 492, which contains accumulated pixel data corresponding to the entire frame resolution as processed by compositing elements 480, 481, and 482. Compositing data stream 492 then is provided to compositing element 483, which inserts data into the compositing data stream.

Compositing element 483 receives pixel data from data stream 458 and compositing data stream 492. Compositing element 483 inserts pixel data from data stream 458 into the compositing data stream and provides a compositing data stream 493, which contains accumulated pixel data corresponding to the entire frame resolution as processed by compositing elements 480, 481, 482 and 483. Compositing data stream 493 then is provided to compositing element 484. Compositing element 484 receives compositing data stream 493, which includes 2D processed graphical data and chroma-key values corresponding to pixels that are to be replaced by processed 3D pixel data. Thus, in response to receiving the aforementioned data, compositing element 484 enables pixel data from compositing data stream 493 to overwrite the pixel data corresponding to data stream 459 where the pixel data corresponding to data stream 459 corresponds to the chroma-key value. Additionally, compositing element 484 facilitates blending of the color values of each of the pixels by determining an average color value for each pixel. In particular, in some embodiments, compositing element 484 discards a portion of the accumulated pixel data to provide an average color value for each pixel. Thereafter, compositing element 484 provides a composite data stream 494, which includes the averaged color value pixel data corresponding to the image to be rendered, to the output mechanism. The process may then be repeated for each subsequent frame of data.

In other embodiments, an average color value for each pixel may be iteratively attained by performing a color-averaging function at every instance where pixel data is inserted into the compositing data stream. For instance, when compositing element 481 receives pixel data from both compositing data stream 490 and data stream 456, compositing element 481 may determine an average color value for each of the pixels based upon data from data streams 490 and 456. The average color value then may be provided to compositing element 482 in the form of compositing data stream 491. Compositing element 482 may then revise the average color value for each of the pixels based upon data from the data streams 491 and 457, and provide the revised pixel data in compositing data stream 492. Compositing element 483 may determine a revised average color value for each of the pixels based upon data from data streams 492 and 458, and provide the revised pixel data in compositing data stream 492. Compositing element 484 may then composite the revised pixel data from compositing data stream 492 with the data from data stream 459 as described hereinbefore.

In a preferred embodiment of the compositor, the various functionality depicted in the schematic diagram of FIG. 19 may be implemented by cards which are adapted to interface with a back-plane of the compositor. More specifically, compositing elements 480 and 481 may be provided on a first input card, compositing elements 482 and 483 may be provided on a second input card, and compositing element 484 may be provided on a third input card. An output card and a controller card also may be provided. Additionally, it should be noted that each of the cards may be interconnected in a "daisy-chain" configuration, whereby each card communicates directly with adjacent cards along the back-plane, although various other configurations may be utilized. However, the "daisy-chain" configuration conveniently facilitates the serial, iterative compositing techniques employed by preferred embodiments of the present invention.

The foregoing discussion of the compositor has focused primarily on the compositing of multiple digital video data streams to produce a single, composite data stream. The following is a description of preferred methods for outputting such a composite data stream. More specifically, the output mechanism, e.g., output mechanism 392 of FIG. 19, will now be described in greater detail.

As depicted in FIG. 19, output mechanism 392 is configured to receive composite data stream 494 and provide an output composite data stream for enabling display of an image on a display device. The output composite data stream may be provided in various formats from output mechanism 392 with a particular one of the formats being selectable based upon a control input provided from the controller. For instance, the composite data stream may be provided as the output composite data stream. i.e., the data of the composite data stream is not buffered within the output mechanism. However, the composite data stream may be buffered, such as when stereo output is desired (described in detail hereinafter). Buffering of the data of the composite data stream also provides the potential benefit of compensating for horizontal and/or vertical blanking which occurs during the rasterization process as the pixel illumination mechanism of the display device transits across the screen between rendering of frames of data. Additionally, the output composite data stream may be converted to analog data, such as by providing the composite data stream to a digital-to-analog converter of the output mechanism.

Reference will now be made to FIGS. 20A–24, which depict various aspects of the stereo output capabilities of preferred embodiments of the compositor. The compositor may facilitate digital video stereo output in both active and passive modes. As utilized herein, the term "active stereo" refers to the presentation of alternating channels, i.e., one channel being associated with the left eye of a viewer (the "left channel") and the other channel being associated with the right eye of the viewer (the "right channel"), of video display. Typically, active stereo is facilitated by the use of headgear that is synchronized with a display device so that the viewer views one channel of the video display with the left eye and the other channel with the right eye. Additionally, as utilized herein, the term "passive stereo" refers to the presentation of simultaneous channels, i.e., one channel being associated with the left eye of a viewer (the "left channel") and the other channel being associated with the right eye of the viewer (the "right channel"), of video display. Typically, passive stereo is facilitated by the use of headgear which is configured to allow each eye of the viewer to view only one of the simultaneously displayed channels of video.

Figure 20A:
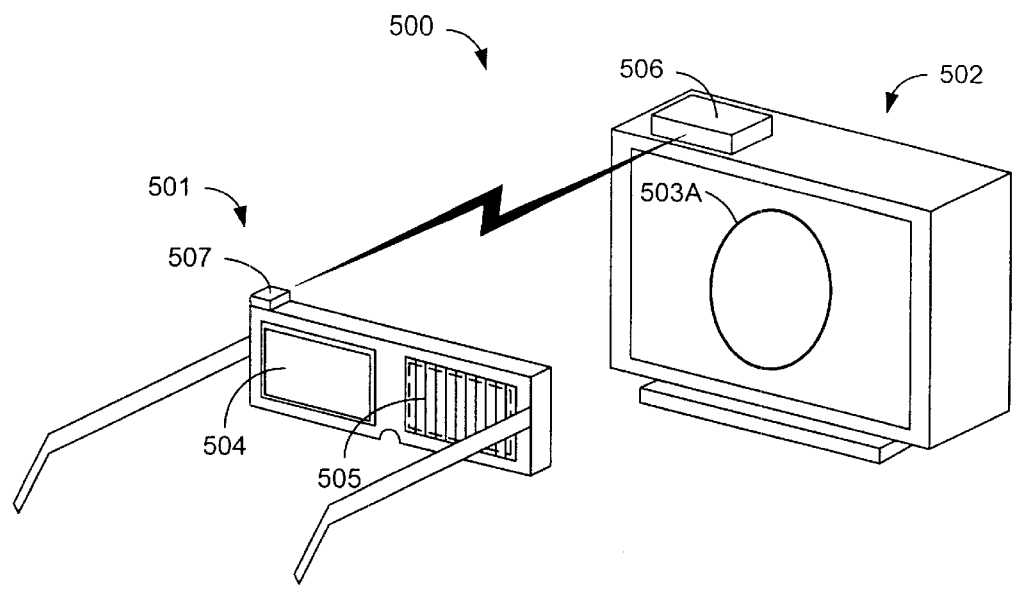
FIG. 20A is a schematic diagram illustrating a representative active stereo system which may be implemented by a preferred embodiment of the present invention.
Figure 20B:
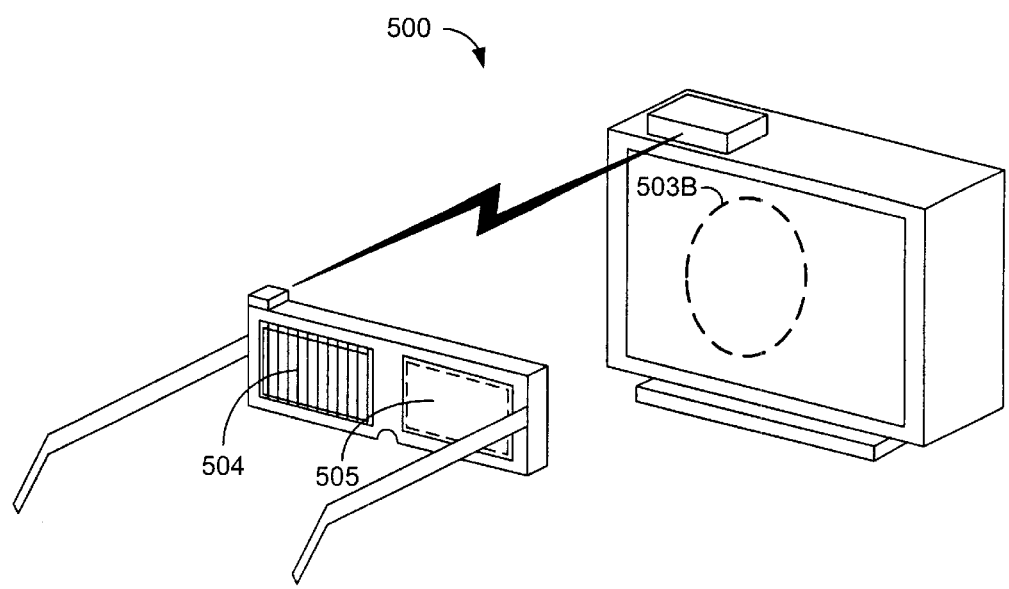
FIG. 20B is a schematic diagram illustrating the representative active stereo system of FIG. 20A.

FIG. 20A depicts a representative example of an active stereo implementation 500, which includes headgear 501 and a display device 502. Headgear 501 is configured to allow a viewer to view an image provided on the display device through only one eyepiece, either eyepiece 504 or 505, of the headgear at a time. Thus, as shown in FIG. 20A, the headgear presently is enabling the viewer to view the image 503A through eyepiece 504. Since image 503A is viewable by the viewer's left eye, the channel providing the video data that enables display of image 503A is the left channel. In contrast, FIG. 20B depicts the headgear as enabling the viewer to view image 503B through eyepiece 505. Thus, the channel providing the video data that enables display of image 503B is the right channel. Enabling a viewer to view an image through an eyepiece or, alternatively, preventing the viewer from being able to view the image through an eyepiece may be accomplished in various manners as is known in the art, with all such manners being considered well within the scope of the present invention.

Synchronization between the headgear 501 and the images displayed on the display device conventionally is facilitated by a synchronization device 506 that is capable of providing signals to the headgear, such as via a synchronization signal receiver 507. In response to the signals, the headgear manipulates the eyepieces so as to allow the viewer to view displayed images through only one eyepiece at a time. Providing synchronization between the headgear and the images displayed on the display device may be accomplished in various manners as is known in the art, with all such manners being considered well within the scope of the present invention.

Typically, active stereo video data is provided to a display device at a frequency of 120 Hz. More specifically, image data corresponding to the left channel is provided for the duration of one cycle, and then image data corresponding to the right channel is provided for the duration of one cycle. This process is then repeated, thereby providing alternating left and right channel images to be displayed on the display device, with the left channel data being displayed 60 times per second and the right channel data being displayed 60 times per second. As the human eye typically is incapable of distinguishing a discontinuity between consecutive images being alternately displayed at such a frequency, an image possessing a characteristic of depth is perceived by the viewer.

Figure 21:
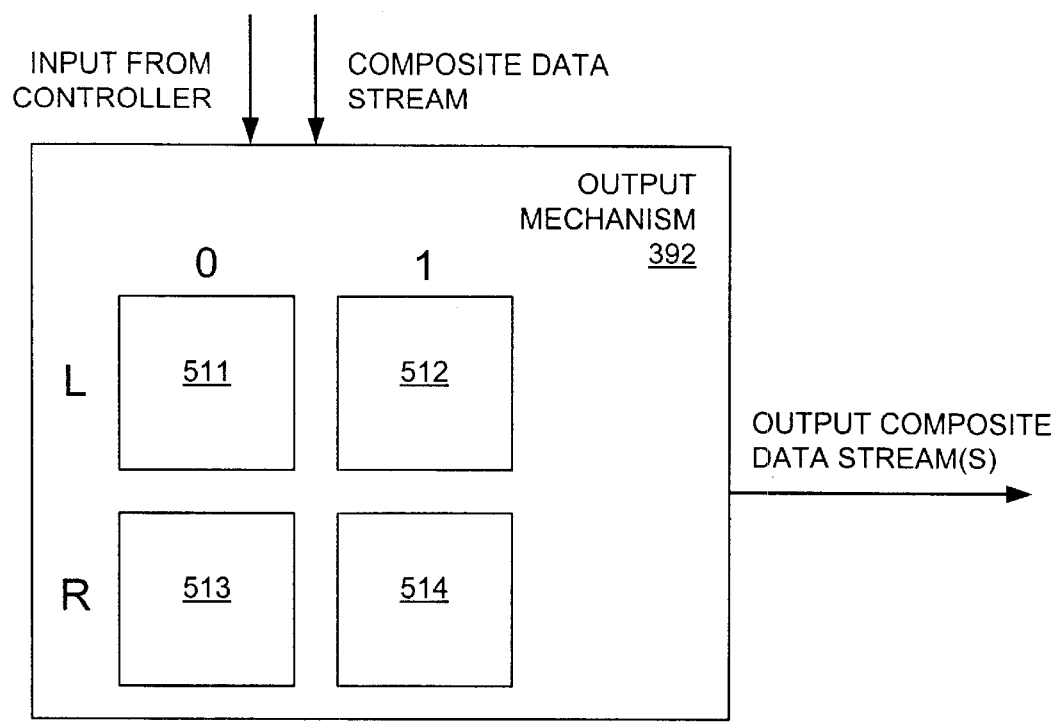
FIG. 21 is a block diagram illustrating a portion of a preferred embodiment of the compositor of the present invention.
Figure 22:
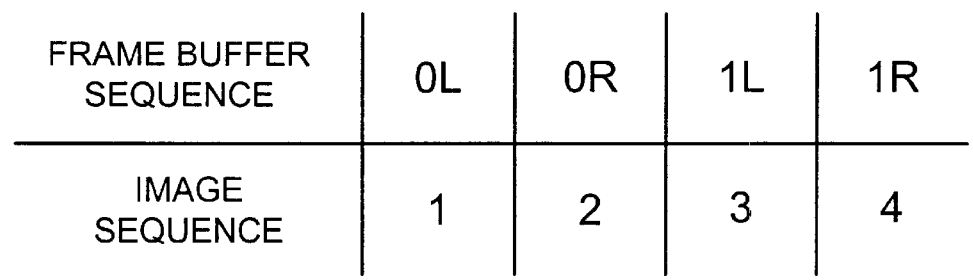
FIG. 22 is a diagram illustrating a representative frame buffer sequence in relation to an image sequence corresponding to an active stereo implementation of the present invention.

As mentioned briefly hereinbefore, preferred embodiments of the compositor may provide an output composite data stream that is appropriately suited for active stereo utilization. Referring now to FIGS. 21 and 22, such an embodiment of the compositor and, in particular, a preferred output mechanism, will be described in greater detail. As shown in FIG. 21, output mechanism 392 preferably includes multiple frame buffers, with several of the buffers, i.e., buffers 511 and 512, being associated with a left channel and several other of the buffers, i.e., buffers 513 and 514, being associated with a right channel. Of the buffers associated with a particular channel, each of those buffers is configured to alternately receive data from the composite data stream and provide viewable data to the output composite data stream. Thus, in the embodiment depicted in FIG. 21, while buffer 511 is receiving data from the composite data stream, buffer 512 is providing viewable data to the output composite data stream. Likewise, while buffer 513 is receiving data from the composite data stream, buffer 514 is providing viewable data to the output composite data stream. So configured, buffers 511 and 513 receive data from the composite data stream while buffers 512 and 514 provide viewable data to the output composite data stream, and vice versa. It should be noted that various other frame buffer configurations may be utilized, such as providing three or more frame buffers per channel, with all such other configurations being considered well within the scope of the present invention.

As depicted in FIG. 22, the frame buffer configuration presented in FIG. 21 enables the following representative data sequence to be contained in the output composite data stream. Assuming that data from a frame buffer is provided to the output composite data stream when that frame buffer has received a complete set of pixel data, frame buffer 5 11 may provide its data to the output composite data stream. Thereafter, frame buffers 513, 512, and 5 14 also may provide their data to the output composite data stream as depicted. As is known, properly alternating between left and right channel data should be maintained as the images provided by the channels typically are slightly offset with respect to each other. Therefore, if a frame buffer is not ready to provide viewable data to the output composite data stream when the frame buffer sequence would normally call for such data, the data previously provided as viewable data from that channel may be provided once again to the output composite data stream. For instance, if frame buffer 512 is not ready to provide viewable data to the output composite data stream, e.g., frame buffer 512 has not yet received a complete set of pixel data, when the frame buffer sequence calls for such data, pixel data from frame buffer 511 may be provided once again to the output composite data stream. Thus, integrity of the alternating left and right channel sequence may be maintained.

In some embodiments, e.g., those embodiments incorporating three frame buffers per channel, one of the frame buffers may be designated as a holding buffer. More specifically, if a frame buffer is not ready to provide viewable data to the output composite data stream when the frame buffer sequence would normally call for such data, pixel data may be provided from the holding buffer to the output composite data stream. In particular, the holding buffer may contain the data previously provided as viewable data to the output composite data stream. Thus, in these embodiments, of the buffers associated with a particular channel, a first of the buffers receives data from the composite data stream, a second of the buffers provides viewable data to the output composite data stream, and a third of the buffers holds or retains the data most recently provided to the output composite data stream as viewable data.

Identification of data contained within the composite data stream as corresponding to either the front or back buffers, e.g., buffer 0 (511 and 513), or buffer 1 (512 and 514), respectively, may be facilitated by chroma-key values, or overscanned information associated with each frame of data, among others. For instance, a first of two chroma-key values may be provided to pixel data associated with the left channel and a second of the two chroma-key values may be provided to pixel data associated with the right channel. So provided, the output mechanism may readily distinguish which pixel data is to be provided to which set of frame buffers by reading the chroma-key values associated with the.incoming data.

Alternatively, by utilizing overscanned information, e.g., information contained in an additional scan line(s) of data which is not intended to be rendered, the output mechanism also may readily distinguish which pixel data is to be provided to which set, i.e., front or back, of the frame buffers.

Figures 23, 24:
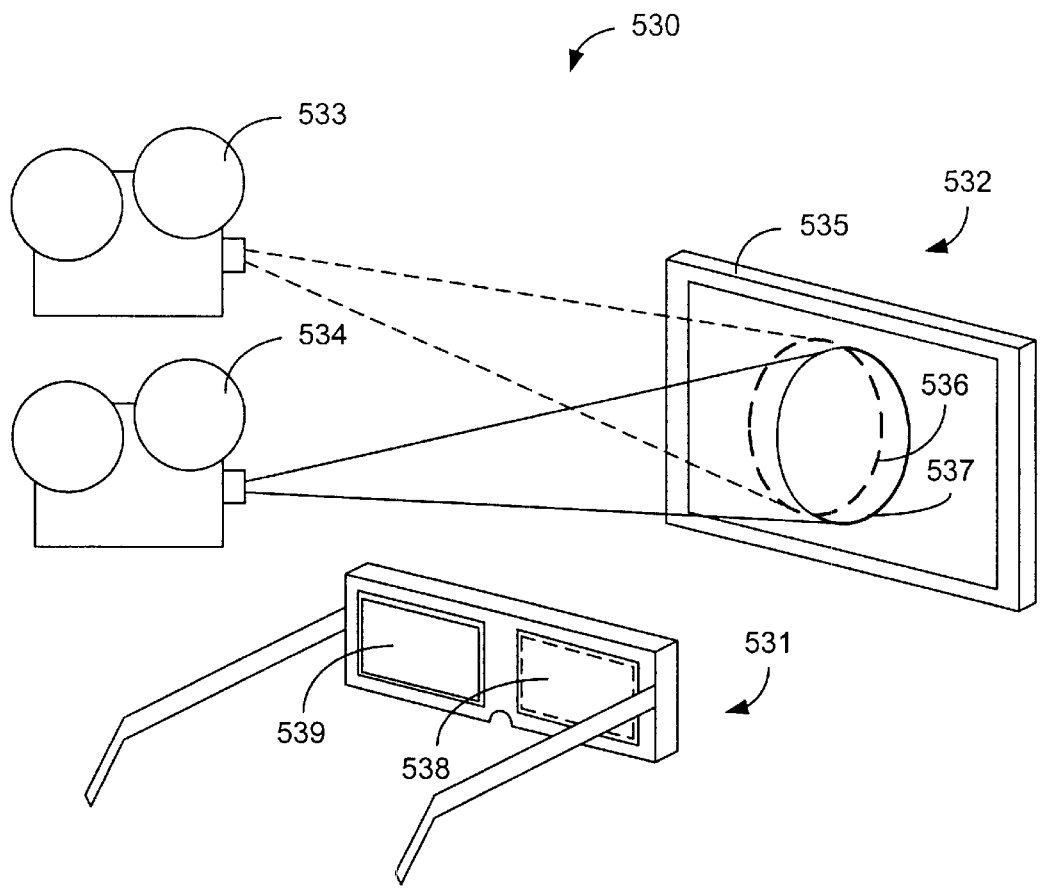
FIG. 23 is a schematic diagram illustrating a representative passive stereo system which may be implemented a preferred embodiment of the present invention.
FIG. 24 is a diagram illustrating a representative frame buffer sequence in relation to an image sequence corresponding to a passive stereo implementation of the present invention.

Referring now to FIG. 23, a representative example of a passive stereo implementation 530 will be described in greater detail. As shown in FIG. 23, headgear 531 and a display device 532 typically are provided. In contrast to the display device 502 of FIGS. 20A and 20B, the display device for implementing passive stereo conventionally employs two video projection devices, e.g., devices 533 and 534, which are each configured to receive one channel of video data and provide a corresponding video image to a screen 535, for example. For instance, projection device 533 is configured to provide an image 536, while projection device 534 is configured to provide an image 537, simultaneously.

Headgear 531 is configured to allow a viewer to simultaneously view the images provided on the display device, with only image 536 being viewable through eyepiece 538, and only image 537 being viewable through only eyepiece 539. Enabling a viewer to view the images in the aforementioned manner may be accomplished with various configurations of headgear as is known in the art, with all such configurations being considered well within the scope of the present invention.

Typically, passive stereo video data is provided to each of the projection devices of a display device at a frequency of between approximately 60 and 120 Hz. Since the left and right channel images are viewed simultaneously, a characteristic of depth of the image is perceived by the viewer.

As mentioned briefly hereinbefore, preferred embodiments of the compositor may provide output composite data streams that are appropriately suited for passive stereo utilization. Referring to FIGS. 21 and 24, such an embodiment of the compositor and, in particular, a preferred output mechanism, will be described in greater detail. As described in relation to the compositor's ability to produce an active stereo output, the embodiment of output mechanism 392 depicted in FIG. 21 preferably includes multiple frame buffers, with several of the buffers, i.e., buffers 511 and 512, being associated with a left channel, and several other of the buffers, i.e., buffers 513 and 514, being associated with a right channel. Additionally, while one buffer of a channel is receiving data from the composite data stream, the other buffer of the channel is providing viewable data to an output composite data stream.

As depicted in FIG. 24, the frame buffer configuration presented in FIG. 21 enables the following representative data sequence to be contained in the output composite data streams of the output mechanism, such as when an appropriate control input, i.e., an inputcalling for a passive stereo output, is received from the controller. Additionally, in some embodiments, data provided from the various pipelines may include overscanned data, e.g., an extra line(s) of data not to be rendered, that may contain instructions for compositing the pixel data provided by the pipelines.

Assuming that data from a frame buffer is provided to an output composite data stream when that frame buffer has received a complete set of pixel data, frame buffer 511 may provide its data to a first or left channel output composite data stream, while frame buffer 513 provides its data to a second or right channel output composite data stream. Thereafter, frame buffers 512 and 514 may provide their data to the first and second output composite data streams, respectively, as depicted. As is known, simultaneously providing corresponding left and right channel data should be maintained as the images provided by the channels typically only are slightly offset with respect to each other. However, the images provided by the two buffers, e.g., buffer 0, which includes frame buffers 511 and 513, and buffer 1, which includes frame buffers 512 and 514, may be entirely different, i.e., they may depict different scenes, as opposed to merely offset images. Therefore, if a particular frame buffer is not ready to provide viewable data to its respective output composite data stream when the frame buffer sequence would normally call for such data, the data previously provided as viewable data from that channel may be provided once again to its output composite data stream. For instance, if frame buffer 512 is not ready to provide viewable data to the left channel output composite data stream, pixel data from the frame buffers of buffer 0, e.g., frame buffers 511 and 513, may be provided once again to their respective output composite data streams. Thus, integrity of the simultaneously provided left and right channel data sequence may be maintained.

It should be noted that embodiments incorporating three or more frame buffers per channel, with at least one of the frame buffers of each channel being designated as a holding buffer also may be provided (described hereinbefore in relation to active stereo). Additionally, in a manner similar to that described in relation to the implementation of active stereo, identification of data contained within the composite data stream as corresponding to either the front or back buffers may be facilitated by chroma-key values. Alternatively, identification of data contained within the composite data stream as corresponding to either the front or back buffers may be facilitated by utilizing overscanned information, e.g., information contained in an additional scan line(s) of data which is not intended to be rendered.

Some embodiments of the compositor may facilitate conversion of pixel data processed for use in an active stereo implementation to pixel data suitable for use in a passive stereo implementation. In particular, data from an application that has been processed by various pipelines to produce an active stereo video output may be provided to the compositor which, in turn, may convert the processed active stereo data into a passive stereo output. As mentioned hereinbefore, active stereo video data typically is provided at 120 Hz, with the left channel data being provided at 60 times per second and the right channel data being provided at 60 times per second in a channel-alternating format. Thus, in order to facilitate suitable display of images associated with such active stereo video data, the compositor receives the active stereo video data from the various processing pipelines in the form of the composite data stream at a frame rate of 120 Hz. However, passive stereo video data typically is provided in two separate data streams, with each stream utilizing a frame rate of 60 Hz.

In order to accommodate conversion of the active stereo video data to passive stereo video data, each frame buffer of a particular channel of the output mechanism is configured to retain its data until a corresponding frame buffer of the other channel has received its data. For instance, frame buffer 511 is configured to retain its data, i.e., frame buffer 511 does not provide its data to an output composite data stream, until frame buffer 513 has received its data. So configured, a sufficient delay may be provided to the active stereo video data of the composite data stream so that the output composite data streams may be provided at the passive stereo video data (60 Hz) rate. Therefore, if a particular frame buffer is not ready to provide viewable data to its respective output composite data stream when the frame buffer sequence would normally call for such data, the data previously provided as viewable data from that channel may be provided once again to its output composite data stream. For instance, if frame buffer 512 is not ready to provide viewable data to the left channel output composite data stream, pixel data from the frame buffers of buffer 0, e.g., frame buffers 511 and 513, may be provided once again to their respective output composite data streams.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for producing a composite digital video data stream, the composite digital video data stream containing pixel data corresponding to an image to be rendered, said method comprising:

receiving multiple digital video data streams, a first of the multiple digital video data streams containing processed pixel data corresponding to at least a portion of the image to be rendered, a second of the multiple digital video data streams containing processed pixel data corresponding to at least a portion of the image to be rendered and a chroma-key value associated with at least some of the processed pixel data; and combining the multiple digital video data streams into the composite digital video data stream by referencing the chroma-key values;

selectively providing an output composite video data stream as a stereo video data stream;

providing a left channel and right channel;

wherein selectively providing the output composite video data stream as a stereo video data stream comprises:

allocating pixel data corresponding to each of the multiple digital video data streams to the left channel and the right channel based upon the chroma-key values of the pixel data;

wherein providing a left channel and right channel comprises:

providing a first buffer and a second buffer for the left channel;

providing a first buffer and a second buffer for the right channel; and wherein the step of allocating pixel data comprises:

allocating pixel data corresponding to each of the multiple digital video data streams to the first buffer and the second buffer of each of the channels based upon the chroma-key values of the pixel data.

2. The method of claim 1, wherein the step of receiving multiple digital video data streams comprises:

receiving three-dimensional pixel data from the first of the multiple digital video data streams; and receiving two-dimensional pixel data from the second of the multiple digital video data streams.

3. The method of claim 1, the first of the multiple digital video data streams contains three-dimensional pixel data, and the second of the multiple digital video data streams contains two-dimensional pixel data; and wherein combining the multiple digital video data streams comprises:

providing a frame of data corresponding to the image to be rendered in response to receiving at least one of the multiple digital video data streams;

inserting the three-dimensional pixel data from the first of the multiple digital video data streams into the frame of data; and overwriting at least a portion of the frame of data with the two-dimensional pixel data of the second of the multiple digital video data streams such that three-dimensional pixel data from the first of the multiple digital video data streams remains in the frame of data at locations corresponding to occurrences of the chroma-key value.

4. The method of claim 1, wherein the step of combining the multiple digital video data streams comprises:

providing a frame of data corresponding to the image to be rendered in response to receiving at least one of the multiple digital video data streams;

inserting pixel data from the first of the multiple digital video data streams into the frame of data; and overwriting at least a portion of the frame of data with data of the second of the multiple digital video data streams such that data from the first of the multiple digital video data streams remains in the frame of data at locations corresponding to occurrences of the chroma-key value.

5. A method for producing a composite digital video data stream, the composite digital video data stream containing pixel data corresponding to an image to be rendered, said method comprising:

receiving multiple digital video data streams, a first of the multiple digital video data streams containing processed pixel data corresponding to at least a portion of the image to be rendered, a second of the multiple digital video data streams containing processed pixel data corresponding to at least a portion of the image to be rendered and a chroma-key value associated with at least some of the processed pixel data; and combining the multiple digital video data streams into the composite digital video data stream by referencing the chroma-key values;

selectively providing an output composite video data stream as a stereo video data stream;

wherein selectively providing a left channel and right channel;

wherein selectively providing the output composite video data stream as a stereo video data stream comprises:

allocating pixel data corresponding to each of the multiple digital video data streams to the left channel and the right channel based upon overscanned information contained in pixel data of the composite digital video data stream;

wherein the step of providing a left channel and right channel comprises:

providing a first buffer and a second buffer for the left channel; and providing a first buffer and a second buffer for the right channel; and wherein allocating pixel data comprises:

allocating pixel data corresponding to each of the multiple digital video data streams to the first buffer and the second buffer of each of the channels based upon the overscanned information contained in pixel data of the composite digital video data stream.

6. The method of claim 5, wherein the step of receiving multiple digital video data streams comprises:

receiving three-dimensional pixel data from the first of the multiple digital video data streams; and receiving two-dimensional pixel data from the second of the multiple digital video data streams.

7. The method of claim 5, wherein the first of the multiple digital video data streams contains three-dimensional pixel data, and the second of the multiple digital video data streams contains two-dimensional pixel data; and wherein combining the multiple digital video data streams comprises:

providing a frame of data corresponding to the image to be rendered in response to receiving at least one of the multiple digital video data streams;

inserting the three-dimensional pixel data from the first of the multiple digital video data streams into the frame of data; and overwriting at least a portion of the frame of data with the two-dimensional pixel data of the second of the multiple digital video data streams such that three-dimensional pixel data from the first of the multiple digital video data streams remains in the frame of data at locations corresponding to occurrences of the chroma-key value.

8. The method of claim 5, wherein combining the multiple digital video data streams comprises:

providing a frame of data corresponding to the image to be rendered in response to receiving at least one of the multiple digital video data streams;

inserting pixel data from the first of the multiple digital video data streams into the frame of data; and overwriting at least a portion of the frame of data with data of the second of the multiple digital video data streams such that data from the first of the multiple digital video data streams remains in the frame of data at locations corresponding to occurrences of the chroma-key value.

9. A device for enabling production of a composite digital video data stream, the composite digital video data stream containing pixel data corresponding to an image to be rendered and being formed from multiple digital video data streams, each of the multiple digital video data streams being provided by a graphics pipeline, each graphics pipeline being configured to process pixel data corresponding to at least a portion of the image to be rendered, said device comprising:

a first compositing element configured to receive pixel data from a first of the multiple digital video data streams such that, in response to receiving the pixel data from a first of the multiple digital video data streams, said first compositing element provides a frame of data corresponding to a resolution of the image to be rendered, said first compositing element being further configured to insert pixel data from the first of the multiple digital video data streams into said frame of data; and a second compositing element communicating with said first compositing element, said second compositing element being configured to receive pixel data and chroma-key values from a second of the multiple digital video data streams, said second compositing element being further configured to overwrite at least a portion of said frame of data with pixel data of the second of the multiple digital video data streams such that pixel data from the first of the multiple digital video data streams remains in said frame of data at locations corresponding to occurrences of said chroma-key value;

an output mechanism communicating with said second compositing element, said output mechanism being configured to selectively provide an output composite video data stream as a stereo video data stream;

wherein said output mechanism has a left channel and a right channel, said left channel having a first buffer and a second buffer, said right channel having a first buffer and a second buffer, said output mechanism being configured to allocate pixel data corresponding to each of the multiple digital video data streams to the first buffer and the second buffer of each of the channels based upon overscanned information contained in pixel data of the composite digital video data stream.

* * * * *